US012602513B1

(12) United States Patent
Meganathan et al.

(10) Patent No.: US 12,602,513 B1
(45) Date of Patent: Apr. 14, 2026

(54) LIVE MASKING

(71) Applicant: U.S. BANK NATIONAL ASSOCIATION, Minneapolis, MN (US)

(72) Inventors: Sathiskumar Meganathan, Frisco, TX (US); Rajasekharam Talluri, Prosper, TX (US)

(73) Assignee: U.S. BANK NATIONAL ASSOCIATION, Minneapolis, MN (US)

( * ) Notice: Subject to any disclaimer, the term of this patent is extended or adjusted under 35 U.S.C. 154(b) by 0 days.

(21) Appl. No.: 19/065,161

(22) Filed: Feb. 27, 2025

(51) Int. Cl.
*G06F 21/62* (2013.01)
*G06V 30/19* (2022.01)

(52) U.S. Cl.
CPC .... *G06F 21/6254* (2013.01); *G06V 30/19173* (2022.01)

(58) Field of Classification Search
CPC ..................... G06F 21/6254; G06V 30/19173
See application file for complete search history.

(56) References Cited

U.S. PATENT DOCUMENTS

| | | | |
|---|---|---|---|
| 9,141,332 B2 | 9/2015 | Coleman et al. | |
| 10,489,608 B2 | 11/2019 | Cheng et al. | |
| 10,701,079 B1 | 6/2020 | Ledet | |
| 10,789,690 B2 | 9/2020 | Duggal et al. | |
| 11,089,134 B1 * | 8/2021 | Gordon ................. | H04W 4/023 |
| 11,475,146 B2 | 10/2022 | Chauhan | |
| 12,141,307 B2 | 11/2024 | Shank et al. | |
| 2008/0046738 A1 * | 2/2008 | Galloway ........... | H04L 63/1416 |
| | | | 713/176 |
| 2013/0325971 A1 | 12/2013 | Winer | |
| 2014/0032267 A1 * | 1/2014 | Smith .................... | G06Q 40/00 |
| | | | 705/7.29 |
| 2015/0254330 A1 | 9/2015 | Chan et al. | |
| 2017/0317983 A1 * | 11/2017 | Kompalli ............... | G06V 30/40 |
| 2017/0374044 A1 * | 12/2017 | Alyubi ................ | H04L 63/0485 |
| 2019/0361694 A1 * | 11/2019 | Gordon ................... | G06F 9/452 |
| 2022/0277435 A1 | 9/2022 | Muthusamy et al. | |
| 2022/0292294 A1 | 9/2022 | Ayyadevara et al. | |
| 2023/0153339 A1 * | 5/2023 | Thungala .............. | G06F 16/335 |
| | | | 707/769 |

(Continued)

OTHER PUBLICATIONS

Abigail Goldsteen et al., "Application-screen Masking: A Hybrid Approach," IEEE Software, 32(4): 40-45, (May 13, 2025). [Retrieved from the Internet Mar. 14, 2025: URL: < https://www.IEEE-security. org/TC/W2SP/2014/papers/ScreenMaskingW2SP.pdf>].

(Continued)

*Primary Examiner* — Stephen T Gundry
(74) *Attorney, Agent, or Firm* — Alston & Bird LLP

(57) ABSTRACT

Various embodiments are directed to apparatuses, methods, computer-readable media, computer program products, and systems related to establishing a first connection with a user component; establishing a second connection with an agent component; receiving, from the user component and via the first connection, an image representative of at least a portion of a graphical user interface, the portion of the graphical user interface comprising sensitive text; applying the image to a masking engine to generate a masked image by masking at least the sensitive text; and transmitting, to the agent component and via the second connection, the masked image.

23 Claims, 9 Drawing Sheets

<u>100</u>

(56) References Cited

U.S. PATENT DOCUMENTS

| | | | | |
|---|---|---|---|---|
| 2023/0344965 A1* | 10/2023 | O'Connell | .......... | H04B 17/318 |
| 2024/0160673 A1* | 5/2024 | Dela Rosa | ............ | G06V 20/20 |
| 2024/0171382 A1* | 5/2024 | Chopra | ................ | H04L 9/0825 |
| 2024/0233249 A1* | 7/2024 | Spong | ..................... | G06T 7/593 |
| 2024/0249474 A1* | 7/2024 | Assouline | .............. | G06T 11/60 |
| 2024/0251136 A1* | 7/2024 | Boyd | ................ | H04N 21/4532 |
| 2024/0275579 A1* | 8/2024 | Mirkin | ................. | H04L 9/0618 |
| 2024/0276228 A1* | 8/2024 | Zhou | .................... | H04L 9/0869 |
| 2024/0288995 A1* | 8/2024 | Short | ................... | G06F 16/583 |
| 2024/0289490 A1* | 8/2024 | Cohen | .................. | G06F 16/986 |
| 2024/0311983 A1* | 9/2024 | Biswas | ............... | G06V 10/774 |
| 2024/0330496 A1* | 10/2024 | Paiuk | ................. | G06F 21/6245 |
| 2024/0331381 A1* | 10/2024 | Paiuk | .................... | G06V 20/46 |
| 2024/0334195 A1* | 10/2024 | Frisk | .................... | H04W 24/08 |
| 2024/0378771 A1* | 11/2024 | Chung | ................ | G06V 30/194 |
| 2024/0394397 A1* | 11/2024 | Scott | ...................... | G06F 9/451 |
| 2024/0394547 A1* | 11/2024 | Simumba | .............. | G06N 3/088 |
| 2024/0403588 A1* | 12/2024 | Jeppe | .................... | G06Q 10/08 |
| 2024/0419772 A1* | 12/2024 | Young, Jr. | .............. | G06F 21/36 |
| 2025/0022264 A1* | 1/2025 | Belskikh | ............... | G06V 20/46 |
| 2025/0029305 A1* | 1/2025 | Harpale | .................. | G06F 3/167 |
| 2025/0053284 A1* | 2/2025 | Mannor | .................. | G06N 3/08 |
| 2025/0078353 A1* | 3/2025 | Ramesh | ............... | G06V 10/945 |
| 2025/0078361 A1* | 3/2025 | Narayana | ................ | G06T 11/60 |
| 2025/0086839 A1* | 3/2025 | Yunusov | ................... | G06T 5/60 |
| 2025/0106457 A1* | 3/2025 | Gokulakannan | ............................ H04N 21/26241 |
| 2025/0124074 A1* | 4/2025 | Ouimet | .................. | G06F 16/51 |

OTHER PUBLICATIONS

Mizuki Ishida et al., "ScreenConcealer: Privacy-protection System with Obfuscations for Screen Sharing," UIST Adjunct '24: Adjunct Proceedings of the 37th Annual ACM Symposium on User Interface Software and Technology, 35:1-3, (Oct. 13, 2024).

Pangeanic, "Data Masking Tool", retrieved from the Internet at URL: <https://web.archive.org/web/20250119090746/https://pangeanic.com/nlp-solutions/data-masking/tool> on Oct. 20, 2025, 5 pages.

Younes Karimi et al., "Automated Detection of Doxing on Twitter," CSCW '25: The 25th ACM Conference on Computer-Supported Cooperative Work and Social Computing, 24 pages, (Nov. 2022).

Yuan Tian et al., "All Your Screens are Belong to US: Attacks Exploiting the HTML5 Screen Sharing Api," IEEE Symposium on Security and Privacy, 34-48, (May 18, 2014).

* cited by examiner

200

106

500

600

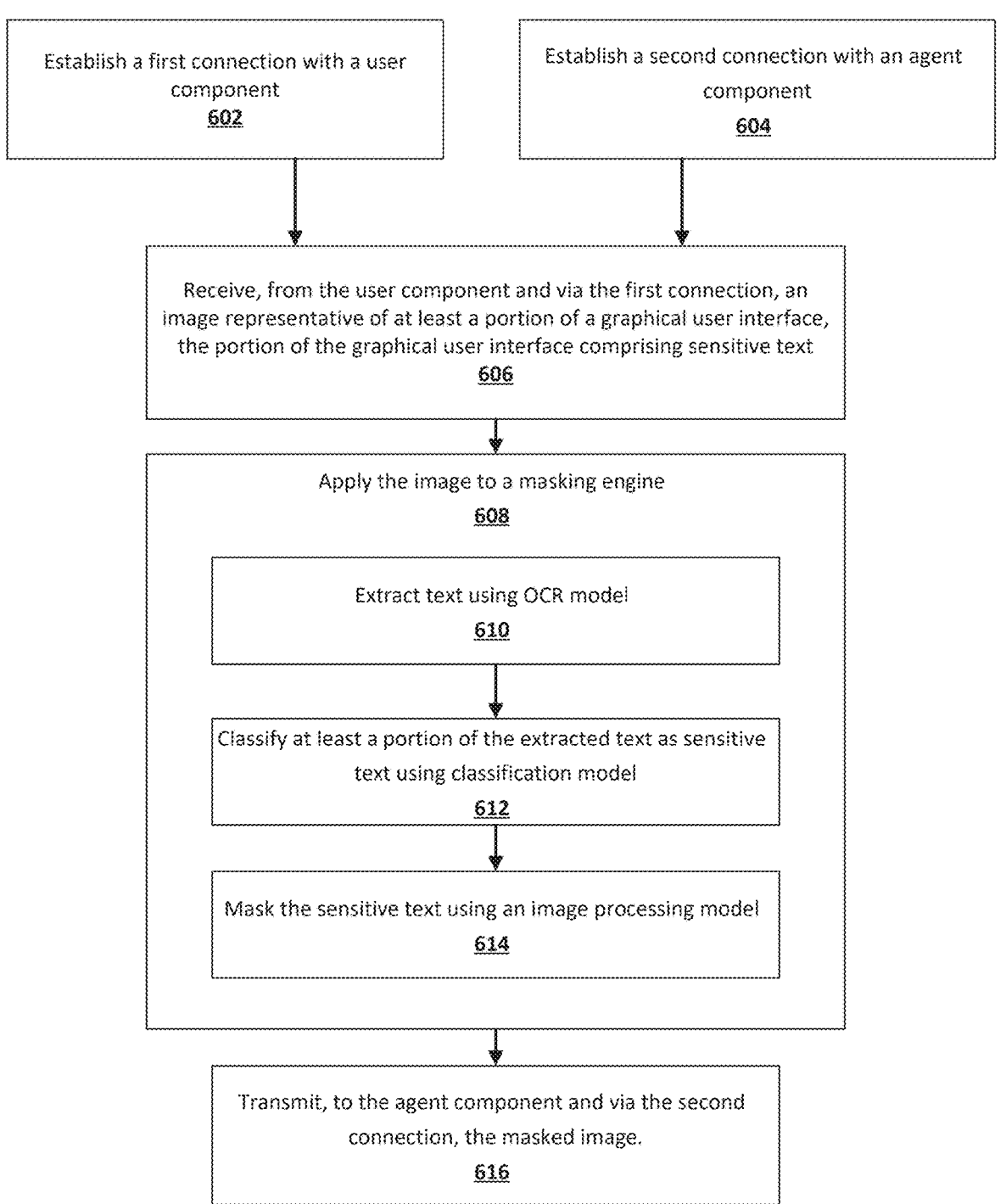

Establish a first connection with a user component
602

Establish a second connection with an agent component
604

Receive, from the user component and via the first connection, an image representative of at least a portion of a graphical user interface, the portion of the graphical user interface comprising sensitive text
606

Apply the image to a masking engine
608

Extract text using OCR model
610

Classify at least a portion of the extracted text as sensitive text using classification model
612

Mask the sensitive text using an image processing model
614

Transmit, to the agent component and via the second connection, the masked image.
616

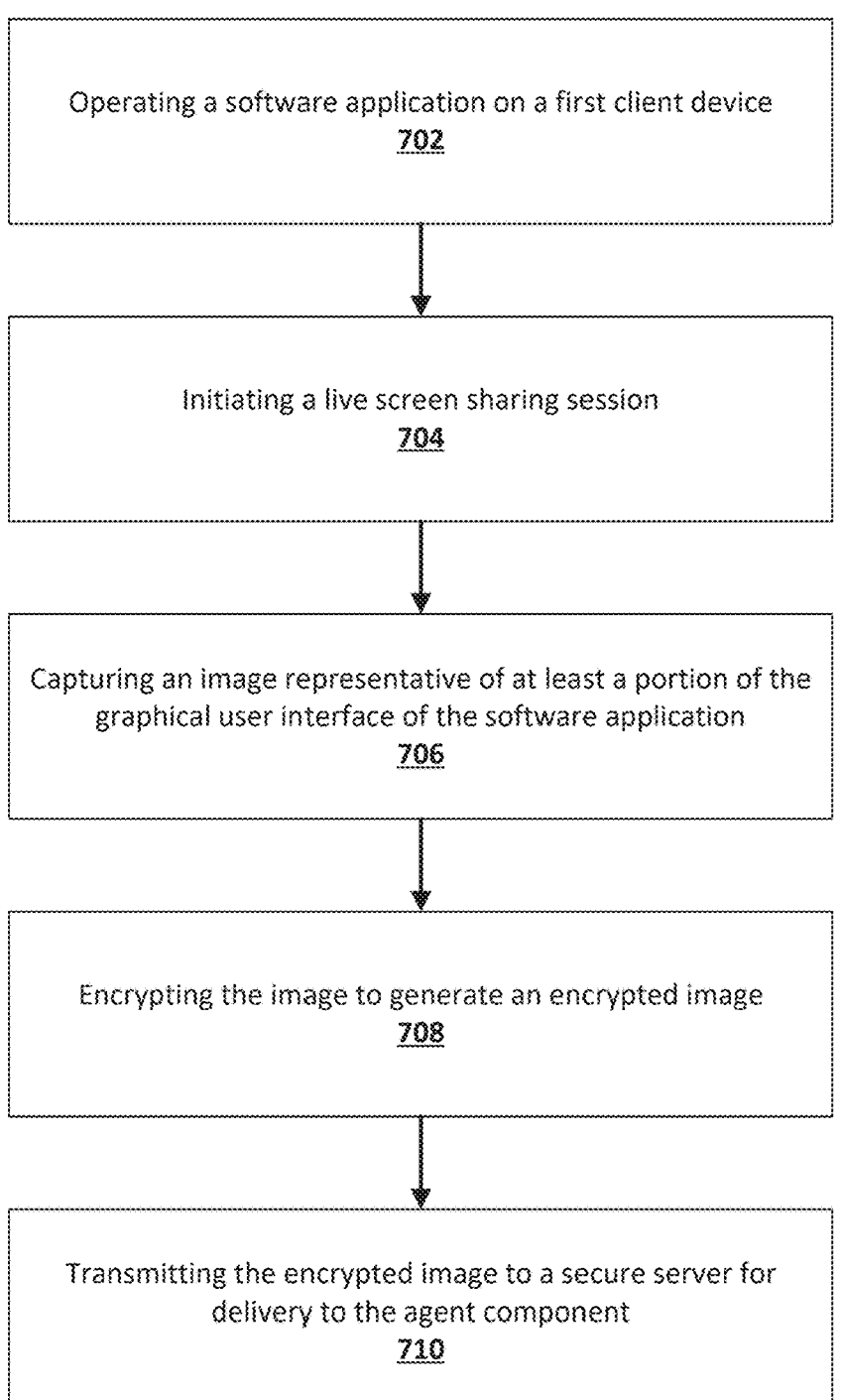

Operating a software application on a first client device
702

Initiating a live screen sharing session
704

Capturing an image representative of at least a portion of the graphical user interface of the software application
706

Encrypting the image to generate an encrypted image
708

Transmitting the encrypted image to a secure server for delivery to the agent component
710

FIG. 7

LIVE MASKING

BACKGROUND

Existing technology cannot effectively and efficiently provide robust image masking in a live image sharing application due to current technological deficiencies, particularly across different software programs and software platforms. Applicant has identified a number of additional challenges associated with providing image masking in a live image sharing application. Through applied effort, ingenuity, and innovation many deficiencies of existing systems have been solved by developing solutions that are in accordance with the embodiments as discussed herein, many examples of which are described in detail herein.

BRIEF SUMMARY

In general, embodiments of the present disclosure provided herein may relate to generating a masked image by masking at least the sensitive text contained therein. Other implementations for generating a masked image will be, or will become, apparent to one with skill in the art upon examination of the following figures and detailed description. It is intended that all such additional implementations be included within this description be within the scope of the disclosure and be protected by the following claims.

In some embodiments, a system may include a first client device comprising a user component; a second client device comprising an agent component; and at least one secure server comprising at least one processor, at least one communications circuitry, and at least one memory, the at least one memory comprising computer coded instructions therein. The computer coded instructions may be configured to, when executed by the at least one processor, cause the at least one secure server to: establish, via the at least one communications circuitry, a first secure connection between the user component and the at least one secure server; establish, via the at least one communications circuitry, a second secure connection between the agent component and the at least one secure server; receive, from the first client device via the first secure connection, an image representative of at least a portion of a graphical user interface displayed at the first client device; apply, via the at least one secure server, the image to a masking engine by: extracting, via an OCR model, text from the image to generate extracted text; classifying, via a classification model, at least a portion of the extracted text as sensitive text; and masking, via an image processing model, the sensitive text to generate a masked image; and transmit, to the agent component via the second secure connection, at least one masked image comprising the masked image.

In some embodiments, the user component comprises first computer coded instructions that, when executed by a first processor associated with the first client device, cause the first client device to: capture the image while the portion of the graphical user interface is displayed on a screen of the first client device; and transmit the image to the at least one secure server via the first secure connection.

In some embodiments, the first computer coded instructions, when executed by the first processor associated with the first client device, further cause the first client device to: encrypt the image prior to transmitting the image as an encrypted image to the at least one secure server via the first secure connection first receive, from the first client device via the first secure connection, wherein the at least one masked image transmitted to the agent component via the second secure connection is unencrypted.

In some embodiments, the agent component comprises second computer coded instructions configured to, when executed by a second processor associated with the second client device, cause the second client device to: receive the at least one masked image; and display the at least one masked image on a screen associated with the second client device.

In some embodiments, the computer coded instructions, when executed by the at least one processor, further cause the at least one secure server to: receive a plurality of images, including the image, from the first device via the first secure connection; generate a plurality of masked images, including the at least one masked image, based on the plurality of images; and transmit a plurality of masked images, including the at least one masked image, to the second device via the second secure connection; wherein receiving the at least one masked image comprises receiving the plurality of masked images, including the at least one masked image, and wherein displaying the at least one masked image on the screen associated with the second client device comprises displaying the plurality of images sequentially as a video.

Some embodiments are directed to a computer-implemented method comprising: establishing, via one or more processors, a first secure connection with a user component; establishing, via one or more processors, a second secure connection with an agent component; receiving, from the user component via the first secure connection, an image representative of at least a portion of a graphical user interface, the portion of the graphical user interface comprising sensitive text; applying the image to a masking engine by: extracting, via an OCR model, text from the image to generate extracted text; classifying, via a classification model, at least a portion of the extracted text as sensitive text; and masking, via an image processing model, the sensitive text to generate a masked image; and transmitting, via one or more processors, to the agent component via the second secure connection, the masked image.

In some embodiments, the computer-implemented method further comprises: receiving, from the user component via the first secure connection, a second image; determining, based on applying the second image to the classification model of the masking engine, that the second image comprises no sensitive text; and transmitting the second image to the agent component. In some embodiments, the image is encrypted, and the computer-implemented method further comprises decrypting the image prior to applying the image to the masking engine. In some embodiments, the masked image is unencrypted.

In some embodiments, the first secure connection comprises a two-way connection channel configured to, in real time, transmit input data detected at a first client device associated with the user component from the first client device to a secure server and transmit input data detected at a second client device associated with the agent component from the secure server to the first client device. In some embodiments, the second secure connection comprises a two-way connection channel configured to, in real time, transmit input data detected at a second client device associated with the agent component from the second client device to a secure server and transmit input data detected at a first client device associated with the user component from the secure server to the second client device. In some embodiments, the computer-implemented method further comprises receiving a live sharing trigger signal from the user component prior to receiving the image.

In some embodiments, the computer-implemented method further comprises receiving a live sharing trigger signal from the agent component prior to receiving the image, and transmitting a second live sharing trigger signal to the user component in response to the live sharing trigger signal, the second live sharing trigger signal configured to prompt the user component to generate and transmit the image.

In some embodiments, the second live sharing trigger signal is configured to cause a prompt to be displayed on a screen of a first client device associated with the user component to approve transmission of the image. In some embodiments, the computer-implemented method further comprises receiving agent feedback from the agent component, and transmitting the agent feedback to the user component. In some embodiments, the computer-implemented method further comprises establishing at least an audio call between a user associated with the user component and an agent associated with the agent component prior to receiving the image.

In some embodiments, the computer-implemented method further comprises: receiving, from the user component via the first secure connection, a sequence of images; applying the sequence of images sequentially to the masking engine by: extracting, via the OCR model, text from each image of the sequence of images to generate extracted text; classifying, via the classification model, at least a portion of the extracted text from each image as sensitive text; and masking, via the image processing model, the sensitive text for each image to generate a sequence of masked images; and sequentially transmitting, via one or more processors, to the agent component via the second secure connection, each masked image of the sequence of masked images in real-time as each masked image is generated.

Some embodiments are directed to a server comprising at least one processor and at least one memory, the at least one memory comprising computer coded instructions therein, wherein the computer coded instructions are configured to, when executed by the at least one processor, cause the server to: establish a first secure connection with a user component; establish a second secure connection with an agent component; receive, from the user component via the first secure connection, an image representative of at least a portion of a graphical user interface, the portion of the graphical user interface comprising sensitive text; apply the image to a masking engine by: extracting, via an OCR model, text from the image to generate extracted text; classifying, via a classification model, at least a portion of the extracted text as sensitive text; and masking, via an image processing model, the sensitive text to generate a masked image; and transmit, to the agent component via the second secure connection, the masked image. The server may be configured to perform any of the foregoing methods.

In some embodiments, the image is encrypted, and the computer coded instructions are further configured to, when executed by the at least one processor, cause the server to decrypt the image prior to applying the image to the masking engine. In some embodiments, the masked image is unencrypted.

BRIEF DESCRIPTION OF THE DRAWINGS

Reference will now be made to the accompanying drawings, which are not necessarily drawn to scale, and wherein:

FIG. 6 illustrates an example flowchart depicting operations in accordance with at least some example embodiments of the present disclosure.

FIG. 7 illustrates an example flowchart depicting operations in accordance with at least some example embodiments of the present disclosure.

DETAILED DESCRIPTION

Figure 1:
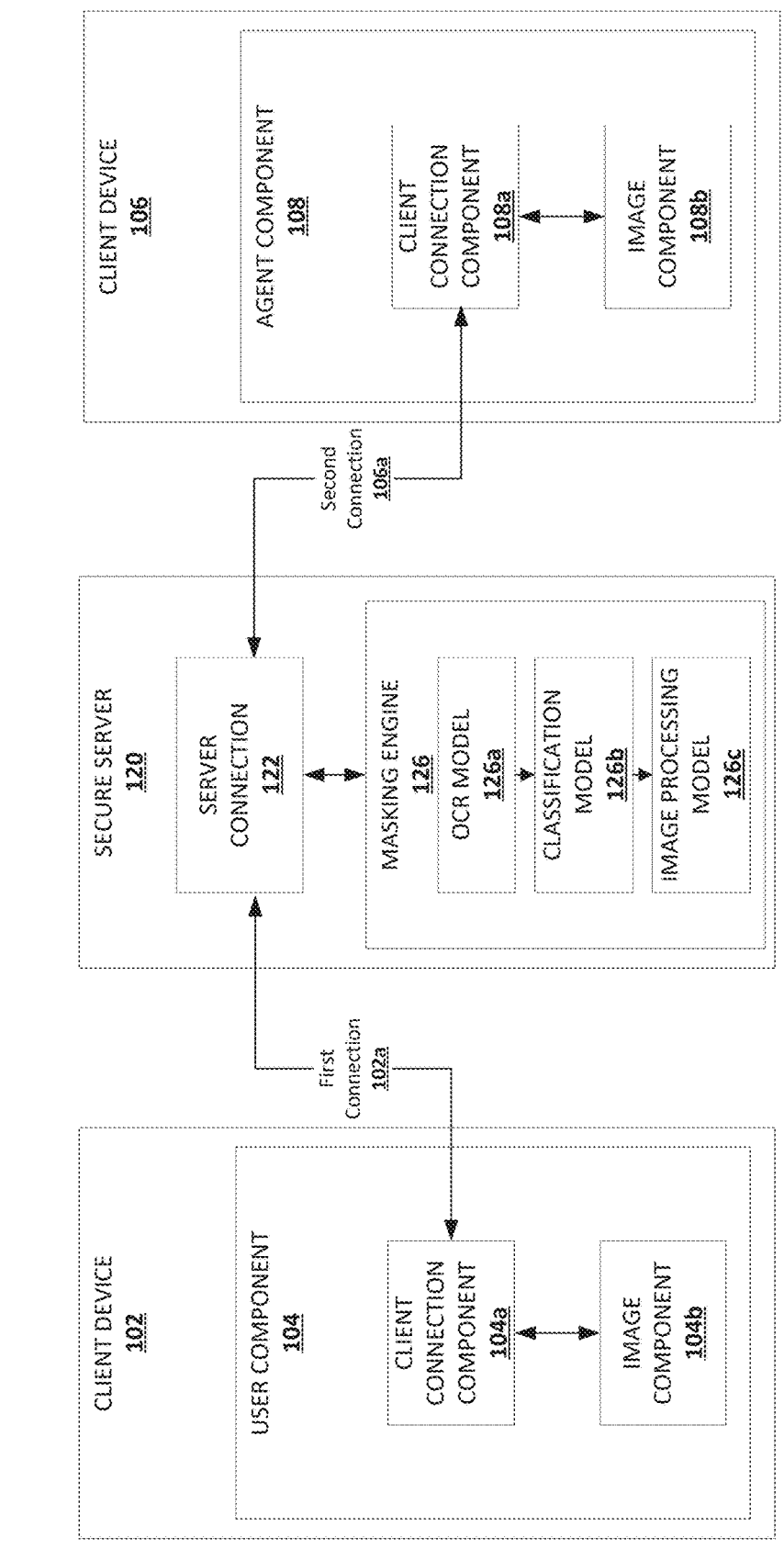
FIG. 1 illustrates an example system environment within which at least some embodiments of the present disclosure may operate.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout. While values for dimensions of various elements may be disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations. As used herein, the term "or" is intended to be used inclusively except where circumstances or express language of the disclosure require otherwise. For example, a list comprising A, B, C, or D may include any one or more of A, B, C, or D (e.g., A+B, A+C, A+D, A+B+C, etc.).

Overview

The present disclosure relates to systems, methods, computer readable media, assemblies, and apparatuses for generating masked images in real time or near real time. In the enterprise sector, products and services offered to users exist across various digital platforms, including websites, mobile applications, and software applications. Often, such products and services require customer support services to address various issues experienced by end users. Providing efficient and effective customer support services is crucial to maintaining a satisfied customer base. Live support calls play a major role in providing customer support services due to the benefits of being able to offer customer support services via an agent which may be in communication with a user remotely. Additional benefits of live support calls include screen sharing, which may allow an agent to see a digital product or service as it is displayed to a user on a local device of the user, enabling agents to provide more efficient and effective support to users. In other contexts, any two users of various client devices may share images (e.g., still images, video, or other image types), including screenshots of graphical user interfaces of their respective client devices or other image data (e.g., images comprising a presentation or video conference).

Some example contexts of image sharing between user client devices may involve sensitive information (e.g., sensitive text). For example, if a user of a bank engages screen sharing during a live support call with an agent to resolve an issue related to an application for managing bank accounts, sensitive text, such as bank account numbers, statements, balances, or other personal information may be exposed to the agent. In live screen sharing or other live image sharing between client devices, sensitive text risks being inadvertently shown to the other user because the images are generated in real time and the content of the images is often ad hoc and unpredictable. Moreover, the domain of image sharing and sensitive text means that the sensitive text must be continuously and accurately protected because any single exposure of the sensitive text to the other user may irreparably and irrevocably disclose the sensitive text.

For example, in a live support context, a user may show the agent various aspects of the graphical user interface associated with the enterprise as displayed on the user (e.g., customer) interface via screen sharing session. Sensitive text may be intermingled with aspects of the graphical user interfaces that the users desire to share. Thus, any sensitive text that may be exposed by sharing the screen of the device of a user during a live support call should be masked from the agent, in some embodiments, without overly restricting visibility of the other interface elements. Moreover, the user may move predictably or unpredictably between various portions of the graphical user interface or various graphical user interfaces during the screen sharing session, each of which may have different sensitive text fields in different locations of the screen.

It is challenging to provide computationally efficient and robust masking for sensitive text during a live image sharing session (e.g., a support call), particularly while providing for a smooth user experience and accommodating the wide range of physical devices that may be operating at either end of the sharing session. For example, some undesirable approaches to the technical problems identified herein may include hard coding sensitive text fields of an application to be masked during any screen sharing sessions. Some processes, such as vision-based analyses, may be prohibitively slow or unreliable. Some such approaches require extensive resources and costs to generate such code which must be replicated for different applications and platforms (e.g., ANDROID, IOS, mobile, desktop, website, etc.) resulting in redundant sets of code, each of which must be updated to account for any changes in a respective application. Additionally, such undesirable approaches must often be performed by the client device and use hard coding which incurs the limitations mentioned above, or use computationally burdensome approaches (e.g., via dedicated, installed software application). For example, a user engaged in screen sharing from a mobile device using hard-coded masking techniques would require that the mobile device perform the computational task of masking out sensitive fields during the screen sharing session, placing extra computational burdens on the client device and potentially resulting in a poorer experience for the user or agent, especially if such tasks are not computationally optimized for light-weight processing (e.g., the client device may have poor connectivity, processing power, battery drain, etc., which may inhibit the live support call from being effective or efficient). Users may be less likely to use and client devices may be less capable of using sensitive information masking tools that require dedicated hardware or software run locally on client devices. Additionally, some user devices may be incapable of running sensitive information masking tools or running such tools sufficiently effectively to avoid leaking sensitive information. Moreover, creating dedicated tools run on individual client devices may increase the number of software versions needed and the number of compatibility and performance issues associated with the various hardware running the sensitive information masking tools. Accordingly, such undesirable approaches incur high development and maintenance costs, poor generalizability across applications and platforms, and place undue computational burdens on client devices, each of which may lead to poor performance, poor usability, and increased technical challenge.

By applying the sensitive text masking techniques described herein, example embodiments provide technical improvements to the fields of screen and other image sharing (e.g., remote sharing between two client devices) by providing for the automatic identification of sensitive text within images and generation of masked images based thereon, which automatic masking may occur in real time or near real time (e.g., at least appearing sufficiently quickly for a live sharing session). Example embodiments may include a secure server that acts as an intermediary between a client device running a user component associated with a user and a client device running an agent component associated with an agent. In some embodiments, the secure server may host the entire communication session between the client devices (e.g., a full support session including screen sharing or other image sharing and additionally handling audio or video communication). In some embodiments, the secure server may handle the image sharing and masking with or without other tasks. While example embodiments herein describe live sharing in a customer support environment for context and illustration, such improvements may be realized in any remote image masking context.

Example embodiments may include a user component associated with the client device of the user, where the user component is configured to capture, directly or indirectly, images of a graphical user interface displayed at the client device of the user (e.g., via screenshotting) and transmit the captured images to the secure server via a first connection (e.g., a first secure connection). Example embodiments may include an agent component associated with the client device of the agent, where the agent component is configured to receive the masked images from the secure server via a second connection (e.g., a second secure connection) and display the images to the agent. The secure server of example embodiments may receive images from the user component, identify and mask sensitive text within the images to generate masked images using a masking engine, and transmit the masked images to the agent component to be displayed to the agent via the client device of the agent.

In some example embodiments, the image sharing process may include the user component capturing screenshots (e.g., a sequence of one or more images captured continuously, at predetermined intervals, upon various trigger conditions, or the like) of the graphical user interface, which interface may be associated with an enterprise application or other subject of the session between client devices. The images may be captured at various frame rates at regular intervals or aperiodically upon the occurrence of various trigger conditions or other predetermined conditions. The images may be captured in the background of the client device (e.g., via the user component, such as an SDK integrated to the mobile application or browser application which enables the screen sharing or other image sharing feature). In some embodiments, the images may be captured based on the user interactions with the client device or graphical user interface (e.g., page navigation, click, scrolling the page up and down, or the like). These screenshot images, which may include sensitive text, may be encrypted and sent to the secure server in an encrypted form. The remaining masking process may occur on the secure server or other third party computing devices. For example, the secure server may process the encrypted screenshot images using an OCR model and a classification model to identify sensitive text, such as confidential words or numbers (e.g., passwords, balances, addresses, phone numbers, account/card numbers, etc.) and apply masking on the identified sensitive text on the images. The masked images are then shared to the agent application in one or more forms.

Various embodiments described herein provide technical improvements by masking sensitive text in images shared between two components without requiring specialized software installed at the client device or intensive processing by the client device. For example, a user may operate a personal laptop to access a website providing a banking service or other service. The user may initiate a screen sharing session during a live support call and the user component of some example embodiments may be included as a feature of the website such that no additional specialized software is required for install at the personal laptop. In another example, the user may operate a personal smartphone with an application installed for a banking service or other service. The user may initiate a screen sharing session during a live support call and the user component of some example embodiments may be included as a feature of the application such that no additional specialized software is required for install at the personal smartphone.

Various embodiments described herein provide technical improvements by leveraging the masking engine to achieve robust and generalizable masking of sensitive text. The masking engine of example embodiments may be platform agnostic allowing a single implementation to be used across mobile applications (e.g., ANDROID, IOS, etc.), desktop applications (e.g., WINDOWS, LINUX, MACOS, etc.), websites, or the like, without requiring bespoke, redundant, or hard-coded solutions that are undesirably subject to changes within applications or graphical user interfaces. Additionally, by leveraging the masking engine, example embodiments described herein provide technical improvements by enabling the masking of sensitive text agnostic to the parameters associated with images captured during screen sharing. For example, some hard-coded solutions may be required to adapt to or account for differences in screen sizes, resolutions, orientations, aspect ratios, or the like in addition to only being able to mask pre-identified text. Example embodiments described herein, by applying the masking engine to extract and analyze text independent of such parameters, provide technical improvements to the generalizability and interoperability of masking sensitive text over computing systems lacking the techniques described herein (e.g., over hard-coded, client device executed masking solutions).

The technical field of live calls and screen sharing or other image sharing (e.g., video conferences) necessitate that data is transmitted between devices in real time or near real time so that users and agents may communicate effectively. Therefore, example embodiments described herein provide important technical improvements to computational efficiency to achieve real-time or near real-time processing.

Some embodiments described herein provide technical improvements by using the secure server to provide improved computational efficiency. For example, the secure server of example embodiments is configured to perform computationally expensive tasks associated with masking sensitive text. By configuring the secure server to perform the computationally expensive tasks associated with masking sensitive text, example embodiments provide technical improvements such as improved performance at client devices and overall system optimization and performance that computing systems lacking such techniques cannot. For example, other computing systems that do not benefit from the techniques described herein may have performance bottlenecks at client devices as a result of poor connectivity, processing power, battery drain, or the like, that cause decreased performance in the computing system overall and in downstream processes (e.g., poor screen sharing and device performance).

Some embodiments described herein provide technical improvements by using the masking engine to provide improved computational efficiency for any device running the masking engine, including but not limited to a secure server. For example, the masking engine, by using the optical character recognition (OCR) model to identify and extract text from images and the classification model to classify extracted text, provides computational improvements over computing systems that, for example, undesirably analyze source code (e.g., a document object manager analyzer) or identify and recognize all aspects of an image (e.g., unrestricted image analysis). By focusing on and extracting text from images, example embodiments provide effective masking of sensitive text while conserving computational resources.

Various embodiments described herein provide technical improvements by using the user component to provide improved computational efficiency. For example, the user component of example embodiments may be configured to capture images during screen sharing in response to detected changes within a graphical user interface. By only capturing images when there is a detected change in the graphical user interface, example embodiments conserve bandwidth and additional computational resources. Additionally, in some embodiments, the user component may capture images based on a bandwidth measure such that a lesser frequency of images may be captured in response to lesser bandwidth measures, thereby conserving bandwidth and additional computational resources. Such improvements to computational efficiency can improve related technical aspects of a live support session such as having improved audio quality and connectivity.

In some embodiments, the improved computational efficiency provided by various aspects of the present disclosure may allow for masking to be performed locally on some client devices. For example, in some embodiments, one or more operations or functionalities of the secure server for masking sensitive text may be performed at the client device with the benefit of the computationally efficient model configurations described herein. For example, in some embodiments, one or more of the OCR model, classification model, or image processing model may be configured to execute locally at a client device (e.g., installed as a part of a user component). In such embodiments, some technical improvements of the present disclosure may be related the selection of computationally light-weight models such as the OCR model and classification model, and/or the configuration of such models with the image processing model to apply masking of sensitive text locally on the client device. In such embodiments, masked images may be generated locally on the client device and transmitted to the secure server, for example, for relay to an agent component.

Some embodiments described herein provide technical improvements by providing improved security. For example, the user component of some embodiments may be configured to encrypt images before transmitting them to the secure server. In this manner, if a third-party were to intercept the images during transmission, the images would not be useable to expose any sensitive information contained therein. In some embodiments, masked images may or may not be encrypted. For example, if sensitive text is masked, masked images may be shared without encryption for computational efficiency. Additionally, example embodiments provide improved security by using the secure server as an intermediary between the agent component and the user component. For example, the secure server can manage secure connections between components and ensure that all secure connections are made to valid entities, activity may be monitored, or the like.

Some embodiments described herein provide technical improvements by using the agent component to provide improved user experience. For example, by providing, via the agent component and a corresponding client device, received images to the agent as video with controllable playback, the agent may rewind, pause, play, fast forward, or the like, during screen sharing, thereby enabling the agent to better control and assist with a live support call and screen sharing session.

Embodiments of the present disclosure may further provide technical improvements in the fields of live image sharing (e.g., support calls or screen sharing) by at least (i) using a user component to transmit an image to a secure server configured to generate a masked image based thereon and transmit the masked image to an agent component, or (ii) applying the image to a masking engine to generate a masked image by masking sensitive text identified within the image. Embodiments of the present disclosure further provide technical improvements in the fields of live image sharing by using a secure server configured to act as an intermediary between client devices and offload computationally expensive tasks from the client devices to allow for improved efficiency. Some embodiments may further improve the live image sharing function by using triggers or other non-periodic or non-continuous image sharing. In some embodiments, for example, sharing live images upon detecting a change in the interface associated with the user component may allow the appearance of a continuous video to be shown on the interface associated with the agent component without requiring continuous video transmission. Furthermore, by using the masking engine described herein in combination with the above-described techniques to achieve improved security and computational efficiency, example embodiments of the present disclosure provide secure, robust, platform agnostic techniques for masking sensitive text identified within images in real time or near real time in a manner necessary for live support calls and live screen sharing related to sensitive information. Embodiments of the present disclosure may be used in a plurality of domains, applications, environments, or architectures and are not limited to any specific domain, application, environment, or architecture.

Definitions

As used herein, the term "enterprise" refers to a business, organization, or other entity. In various embodiments, an enterprise may be associated with users (e.g., customers of the enterprise or the like) and agents (e.g., employees of the enterprise or the like). In some embodiments, an enterprise may be associated with an enterprise system such as one or more computing devices embodied in hardware, software, firmware, or a combination thereof, operated by or otherwise controlled by the enterprise or an agent thereof for purposes of supporting one or more actions performed by the enterprise. In certain embodiments, the enterprise system may be defined by a collection of computing devices or software programs including one or more secure servers, repositories, client devices, components, or the like. For example, an enterprise system may include a software program, component, application, platform, service, or the like, that is configured to communicate with one or more client devices for purposes of performing one or more actions that define various functions or operations of the enterprise system, including various digital transmissions between client devices or servers of the enterprise system (e.g., to facilitate customer support calls and interactions). The enterprise system may include one or more intermediary devices, such as a secure server communicatively disposed between two client devices comprising respective components for communication therebetween via the secure server. In some embodiments, the intermediary device(s) may be configured to perform one or more functions associated with the client device communications, such as the various embodiments of masking described herein.

The term "client device" and similar terms may be used interchangeably to refer to a computer comprising at least one processor and at least one memory. In some embodiments, the client device may further comprise one or more of: a display device for rendering one or more of a graphical user interface, a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" and the aforementioned similar terminology may refer to computer hardware or software that is configured to access a service or functionality offered by an enterprise or enterprise system, for example, a service or functionality that is made available by a secure server. Such a secure server may be in a different location or another computing system, in which case the client device may access the secure server by way of a network. In some embodiments, a client device may be associated with a particular operator. For example, a client device may be operated by a user of an enterprise and embodied by the user's computer, smartphone, or the like. In another example, a client device may be operated by an agent of an enterprise and embodied by an enterprise computer, enterprise terminal, or the like. In some embodiments, a client device may be a general purpose computing device having special purpose computer programming stored or executed thereon (e.g., a program, application, or web browser session running on a personal computer or smartphone). In some embodiments, a client device may be configured as a terminal or other remote viewing apparatus configured to display graphical user interfaces and associated information generated on a remote computing device. In some embodiments, a client device may be a special purpose computing device configured to perform the various functions described herein. Various embodiments of client devices may include, without limitation, smartphones, tablets, laptops, terminals, kiosks, personal computers, desktop computers, enterprise computers, or the like. Various embodiments of client devices may operate using different operating systems including, without limitation, IOS, ANDROID, WINDOWS, MACOS, LINUX, CHROME OS, or the like.

As used herein, the term "sensitive text" refers to textual data targeted by a masking engine for masking, identified by a masking engine for masking, or masked by a masking engine. Sensitive text may be any type of text and may include any information. For example, in some embodiments, sensitive text comprises personal information unique or partially unique to a user. For example, sensitive text may be textual data that is personally identifying (e.g., name, phone number, social security number, physical address, email address, age, etc.) or valuable (e.g., bank account numbers, log in information, passwords, etc.) which an individual such as a user may wish to keep private. In some embodiments, sensitive text may be irrelevant or otherwise targeted for masking (e.g., flagged via changing a variable in memory to target a specific text or type of text or targeted, directly or indirectly, via selection of training data or other criteria for the masking engine). For example, in some embodiments, sensitive text may include any text that is unique to the user of the user component; irrelevant to the live screen sharing session (e.g., irrelevant to the problem or malfunction experienced by the user), such as personal information; or confidential. In some embodiments, sensitive text may be displayed within a graphical user interface, transmitted via screenshot of a graphical user interface, and be at risk of being exposed. For example, a graphical user interface associated with a mobile or web application for an enterprise service (e.g., a bank or other enterprise) may display sensitive text associated with a user, and if the user engages in a screen sharing session with an agent, the sensitive text may be exposed to the agent absent a masking process. The sensitive information may also be exposed during network transmissions. In some embodiments, sensitive text may be masked to avoid exposure. For example, in a screen sharing session where sensitive text may be exposed, a masking engine may be applied to images associated with the screen sharing session to obscure sensitive text.

As used herein, the term "masking engine" refers to one or more software or hardware elements configured to receive images and, responsive to detecting sensitive text within the images, generate masked images by masking at least the sensitive text. In some embodiments, the masking engine may include one or more models (e.g., rules-based models or machine learning models) configured to perform one or more functionalities of the masking engine including, but not limited to, an optical character recognition model, a classification model, an image processing model, or the like. In some embodiments, the masking engine may be associated with or otherwise included within or executed by the secure server. For example, the secure server may be configured to apply the masking engine to one or more images to generate masked images therefrom.

In an example embodiment, an image may be representative of at least a portion of a graphical user interface displayed at a client device, such as a screenshot of an enterprise application (e.g., a mobile application, web application, or the like). The image may be generated via capturing a screenshot of the graphical user interface or a portion thereof. In some embodiments, the enterprise application may include software configured to capture the screenshot, and in some embodiments, an operating system or other separate software process executed on or otherwise in association with the client device may be configured to capture the screenshot. For example, the image may include sensitive text such as private bank account information and personally identifying information associated with a corresponding user. The image may additionally include relevant, non-sensitive text or other data, such as graphics, that the agent may need to see or access. The sensitive text may be positioned at one or more locations on the graphical user interface with the non-sensitive text or other data intermixed therewith (e.g., one or more sections of sensitive text between or adjacent to one or more sections of non-sensitive text or other data).

The masking engine may be applied to the image to mask the sensitive text. In some embodiments, the masking process may comprise one or more steps. For example, in some embodiments, the masking engine may be configured to extract text from the image for analysis. Extracting the text may improve the performance and accuracy of the model and underlying computing device (e.g., the secure server) by reducing the model training time and the quantity of training data needed, reducing the processing power needed to execute the model, and speeding execution of the model relative to vision based analyses. The masking engine may apply the OCR model to the image to identify and extract any text in the image.

The extracted text may be provided to the classification model, which may be applied to the extracted text to classify the extracted text for further processing. For example, the classification model may take, as an input, discrete strings of extracted text (e.g., individual groupings of text, such as words, sentences, or text from certain regions of the graphical user interface) or other strings of extracted text (e.g., an entire set of extracted text from the image or a portion thereof), and the classification model may output one or more classifications associated with one or more strings or portions of strings of the input extracted text. For example, the classification model may be configured to classify input extracted text as sensitive text or non-sensitive text. Based on any extracted text being classified as sensitive text, an image processing model may be applied to the image to generate a masked image by masking any region of the image corresponding to where the sensitive text is. The masked image may be output by the masking engine, for example, to be transmitted via a secure connection to an agent component engaged in a screen sharing session. In some embodiments, the masking process may occur automatically in response to receipt of the image from a client device. In some embodiments a user may be presented (e.g., via graphical user interface) with selectable options for masking (e.g., identifying or confirming identified sensitive text).

In some embodiments, the masking engine may forego or otherwise skip masking an image. For example, the masking engine may determine an image has no sensitive text or fail to identify any sensitive text within an image and, in response, output the original image, stop processing the image, indicate the image may be transmitted without masking, or the like, to avoid further computational waste or delay.

In some embodiments, the masking engine may be configured to mask an entire image. For example, the masking engine may include logic configured to determine a complexity of masking to be applied and, if the complexity exceeds a certain threshold, the masking engine may mask the entire image. For example, if an amount of masking to be applied exceeds a threshold (e.g., 80% of an image is to be masked, more than 15 places in an image are to be masked, etc.), the masking engine may determine the entire image should be masked. In some embodiments, an entire image may be masked if a classification of any one or more extracted text strings is indicative of the entire interface being sensitive (e.g., classifying the image or graphical user interface page as a screenshot of a non-enterprise application, a page or other portion of the enterprise application not intended for the agent (e.g., user personal information page), or the like). For example, in some embodiments, an agent may be authorized to view one or more specific pages of an enterprise application, and the masking engine may be configured to mask each page not positively identified as an authorized specific page(s). In some embodiments, such logic may be used to avoid errors or improve security. In some embodiments, the classification engine (defined below) may analyze extracted text independently of the underlying graphical user interface and may mask sensitive text on a text-by-text basis (e.g., string by string, word by word, sentence by sentence, etc.).

In some embodiments, the masking engine or one or more models of the masking engine may be trained for a particular domain. For example, the predictable and controllable nature of an enterprise system may result in particular and pre known software program applications, contexts, subject domains, or the like, that restrict the domain of images and text that the masking engine will encounter. Consequently, in some embodiments, the masking engine or one or more models of the masking engine may be trained or fine-tuned based on such restricted domains. As one example, the OCR model may benefit from being trained or fine-tuned on image data from a predetermined application. In another example, the classification model may benefit from being trained or fine-tuned to classify extracted text as sensitive text or non-sensitive text based on textual data from a predetermined application.

Additionally or alternatively, in some embodiments, training data may be sourced from enterprise systems to provide readily accessible and applicable training data sets. For example, an enterprise system may be configured to provide secure screen sharing where sensitive text is masked using certain undesirable approaches, such as by hard-coding certain data fields to be masked during screen sharing. Such a system may be leveraged to generate training data where the fields to be classified as sensitive text are already labelled via the hard-coded approach.

As used herein, the term "optical character recognition model", "OCR model", and the like refers to a model configured to identify or extract text from images. The OCR model may comprise software or software used with enabling hardware to convert text (e.g., any style or format of text in any language or character type) into extracted text (e.g., by extracting the text from the image). In some embodiments, the OCR model may include one or more models or machine learning models configured to perform one or more functionalities of the OCR model or masking engine including, but not limited to, convolutional neural networks, recurrent neural networks, convolutional recurrent neural networks, transformers, object detection models, or the like. In some embodiments, the OCR model may include or be embodied by, for example, TESSERACT OCR, GOOGLE VISION OCR, MICROSOFT AZURE OCR, or the like. In various embodiments, the OCR model (e.g., including one or more algorithms or models (also referred to as sub-models) therein or associated therewith)

may be configured to perform one or more of the following: image pre-processing (e.g., noise reduction, binarization, skew correction, etc.); segmentation (e.g., dividing an image into regions containing text by detecting lines, words, characters, columns, rows, etc.); generating bounding boxes (e.g., identifying regions of the image with text using bounding boxes); feature extraction (e.g., extracting features from characters such as edges, corners, lines, or the like, used to identify characters); character recognition (e.g., applying a convolutional neural network, recurrent neural network, or the like, to identify characters or words based on extracted features); post processing (e.g., applying a dictionary, large language model, transformer, or the like, to identified characters to improve accuracy and correct mis-identified characters or words); data generation (e.g., generating location data, metadata or bounded regions such as (x,y) coordinate data indicative of where particular text is within the image); or the like. For example, in some embodiments an example optical character recognition model flow may include (a) image preprocessing, (b) text detection, (c) character recognition, and then (d) post processing. In some embodiments, images may be processed for masking in a temporary storage (e.g., heap memory) such that extracted text is not stored or logged in physical memory (e.g., unrecoverable).

In an example embodiment, the OCR model may be trained on a training data set including a large and diverse set of images containing text. For example, the images of the training data set may include images containing text in various fonts, sizes, orientations, languages, opacities, or the like. In some examples, the images of the training data set may include varying noise levels (e.g., how clear or unclear the text is, how much information such as other entities, objects, icons, graphics, or the like, are included in the image). In some examples, the images of the training data set may be constrained to a domain, or the OCR model may be fined-tuned on a particular domain of training images. For example, the OCR model may be trained to extract text specifically from graphical user interfaces. In some embodiments, the OCR model may be fine-tuned on particular graphical user interfaces, such as those associated with a particular enterprise system (e.g., mobile applications, websites, or the like associated with a particular enterprise). In some examples, the images of the training data set may be annotated with the correct corresponding text to provide ground truth data which the OCR model may be trained to predict, such as by optimizing a loss function (e.g., minimizing without overfitting).

In some embodiments, the OCR model may forego further processing of an image or otherwise skip masking an image or the OCR model may be bypassed in the masking engine framework where not needed. In some embodiments, the image may include or be transmitted with pre-extracted text such that OCR is not necessary. For example, the OCR model may determine an image has no text or fail to extract any text within an image and, in response, stop processing the image, indicate the image may be transmitted without masking, or the like, to avoid further computational waste or delay.

As used herein, the term "classification model" refers to a model configured to generated predicted classifications based on an input (e.g., extracted text generated by the OCR model). The classification model may comprise software or software used with enabling hardware to generate one or more predictions based on a text-based input (e.g., the extracted text). In some embodiments, the text-based input may reduce the processing load on the device performing the classification. In some embodiments, the classification model may include one or more models or machine learning models configured to perform one or more functionalities of the classification model or the masking engine including, but not limited to, a logistic regression, naïve bayes, support vector machine, decision tree, random forest, k-nearest neighbors, recurrent neural network, long short-term memory network, convolutional neural network, transformer, gradient boosting, or the like. In various embodiments, the classification model may be configured to perform one or more of the following: data preprocessing (e.g., tokenization, normalization, vectorization, etc.); feature extraction (e.g., extracting n-grams, part of speech tagging, named entity recognition, etc.); classification (e.g., generating predicted classifications such as "sensitive" or "non-sensitive" for extracted text or units of extracted text based on extracted features); data generation (e.g., generating metadata or bounded regions indicative of where particular classified extracted text is within the image); or the like. In some embodiments, images may be processed for masking in a temporary storage (e.g., heap memory) such that extracted text is not stored or logged in physical memory.

In some embodiments, the classification model may take, as an input, discrete strings of extracted text such as individual words or sentences. In some embodiments, such discrete strings of extracted text may be grouped, for example, by proximity, a region of a graphical user interface they are extracted from, or the like, or such discrete strings of extracted text may include all extracted text from an image or portion of an image.

In some embodiments, the classification model may generate one or more classifications, embeddings, tags, scores, or the like, based on input extracted text. In some embodiments, one or more intermediate outputs may be used in order to better classify extracted text as sensitive text or non-sensitive text. For example, an embodiment, the classification model may include a transformer-based model (e.g., BERT) and be trained to receive extracted text and generate a predicted classification based on whether the input extracted text is more likely to be sensitive text or non-sensitive text. Such a model may be configured to receive extracted text including only one word, a few words, or many words (e.g., multiple sentences), tokenize the extracted text, and generate a probability distribution.

In another example embodiment, the classification model may include multiple models, such as, for example, a named entity recognition model and a final classifier (e.g., a random forest classifier, a feedforward neural network, etc.). In such an example, the classification model may receive extracted text and, using the named entity recognition model, generate intermediate tags that identify one or more entities associated with the extracted text such as, for example, "account number," "date," "personal contact information," or the like. In such an example, the classification model may then feed the intermediate tags (e.g., as embedded vectors) as features with or without the original extracted text to the final classifier to generate a classification of the extracted text as being sensitive text or non-sensitive text. In other embodiments, other model architectures and techniques may be used to perform the functionalities of the classification model described herein.

In an example embodiment, the classification model may be trained on a training data set including a large and diverse set of text. For example, the text of the training data set may include text of varying lengths (e.g., individual words, sentences, paragraphs, etc.), languages, contexts, or the like. In some examples, the text of the training data set may include varying noise levels (e.g., how fragmented or unclean the text is). In some examples, the text of the training data set may be constrained to a domain, or the classification model may be fined-tuned on a particular domain of training text. For example, the classification model may be trained to classify text specifically from graphical user interfaces of a particular domain, such as those associated with a particular enterprise system (e.g., mobile applications, websites, or the like associated with a particular enterprise). In some examples, the text of the training data set may be annotated with the correct corresponding label (e.g., sensitive text or non-sensitive text or other intermediate labels) to provide ground truth data which the classification model may be trained to predict, such as by optimizing a loss function (e.g., minimizing without overfitting). In some embodiments, the classification model may be text dependent and independent of the screen (e.g., bank account numbers or other sensitive text may be identified and masked regardless of the particular interface page or region of the screen on which they appear). This process may, in some embodiments, allow for masking independent of the attributes of the screen (e.g., aspect ratio, etc.), the software application (e.g., mobile, tablet, or PC versions), scroll position (e.g., for interfaces that are larger than the screen), or other physical attributes of the text as presented on the graphical user interface.

In some embodiments, the classification model may forego further processing of an image or otherwise skip masking an image or the classification model may be bypassed in the masking engine framework where not needed. For example, the classification model may determine an image has no sensitive text or fail to identify any sensitive text within an image and, in response, stop processing the image, indicate the image may be transmitted without masking, or the like, to avoid further computational waste or delay.

In some embodiments, a second classification model may be trained that includes a computer vision model configured to classify the image or a portion thereof. The second classification model may be trained according to the various processes disclosed herein, and may be configured to classify the image or a portion thereof for informing one or more downstream processes. For example, each image or a subset of the received images may be first classified to identify a graphical user interface type. The graphical user interface type may serve as a pre-screening for the masking engine to sort the types of interfaces requiring masking from the types that do not. For example, certain pages of a software application (e.g., privacy policies, menus, or other interface elements lacking sensitive text) may be classified for identification and, based on the lack of any possible sensitive text thereon, may be pre-screened for transmission directly to the agent component (or may be withheld as irrelevant to the agent component) rather than being masked. This pre-screening may further reduce the load on the computing processes of the secure server and expedite and facilitate the live screen sharing. In some embodiments, the second classification model may identify an image of a same type (e.g., the same graphical user interface or same type of graphical user interface) as a previous image, and the server may, in some embodiments, retrieve and apply a masking from the previous image to the newly captured and analyzed image.

As used herein, the term "image processing model" refers to a model configured to generate a masked image based on an image. The image processing model may comprise software or software used with enabling hardware to generate the masked image. As used herein, "generating" the masked image may comprise any process by which one or more pieces of sensitive text are obscured, covered, removed, or otherwise rendered less readable or unreadable in the image. In some embodiments, the image processing model may include one or more models or machine learning models configured to perform one or more functionalities of the image processing model or masking engine including, but not limited to, an imaging library (e.g., OpenCV, Python Imaging Library, etc.), generative adversarial network, auto-encoder, image generator, or the like. In some embodiments, the image processing model may be configured to generate a masked image based on an image by modifying the image or generating a new image. For example, the image processing model may receive an image including one or more regions labelled for masking or metadata identifying one or more regions of the image for masking, and in response, generate a masked image by masking each region. In an example embodiment, the image processing model may be an image editing library that receives an image as a file and one or more defined regions or pixels to mask (e.g., bounded regions within the image, metadata, etc.). In this example, the image processing model may open the file for the image, generate a mask for the defined regions or pixels, and generate a masked image by combining the mask and the image into a new file. In some embodiments, generating the masked image may comprise replacing a data file associated with the image with a new data file comprising the masked image. In some embodiments, generating the masked image may comprise editing the data file associated with the image to render the sensitive text obscured, covered, removed, or otherwise rendered less readable or unreadable. In some embodiments, generating the masked image may be permanent, such that the sensitive text cannot be recovered from the masked image. For example, in some embodiments, an image may be processed for masking in a temporary storage (e.g., heap memory) such that original images are not stored or logged in physical memory. In other embodiments, the masked image may be reversible or the original image may be stored separately with the sensitive text intact.

In some embodiments, the image processing model may forego or otherwise skip masking an image or the image processing may be bypassed in the masking engine framework where not needed. For example, the image processing model may determine an image has no sensitive text or fail to identify any regions for masking within an image and, in response, output the original image, stop processing the image, indicate the image may be transmitted without masking, or the like, to avoid further computational waste or delay.

As used herein, the term "mask," "masking," and similar terms may be used interchangeably to refer to any process, method, or technique for obscuring, covering, removing, or otherwise rendering sensitive text less readable or unreadable within an image. For example, masking may include blurring a region of an image, adding an image or pixels to cover a region of an image (e.g., an opaque rectangle), modifying pixel values of an image, removing pixels or data from an image, or the like.

The term "secure server" refers to one or more computing devices associated with an enterprise system and configured to receive, store, and otherwise process data in order to enable one or more of the various functionalities of the present disclosure. The secure server may comprise hardware or hardware with enabling software configured to perform one or more of the various functionalities described herein. For example, the secure server may enable net-worked communication of digital transmissions between networked client devices connected thereto. In certain embodiments, the functionality of the secure server may be provided via a single physical computing device, or, alternatively, via a collection of physical computing devices having a common functionality, or, in further alternative embodiments, the functionality of the secure server may be segmented among a plurality of devices or collections of devices performing subsets of the described functionality of the secure server. In various embodiments, the secure server is configured to receive, generate, transmit, store, encrypt, decrypt, or otherwise process data (e.g., text data, audio data, image data, video data, etc.) to be communicated between client devices, components, third party systems, or the like. For example, the secure server may be configured to execute various instructions, actions, or the like so as to enable communications between various client devices associated with an enterprise system.

In some embodiments, the secure server may be configured to support full-duplex connections to support bi-directional communication between the secure server and a connected component. In some embodiments, the secure server may include a library, component, or the like, configured to support such connections (e.g., ws for Node.js, websockets for Python, built in support in web servers using Nginx, etc.), sometimes referred to as a server connection.

In some embodiments, the secure server may be configured to facilitate customer support sessions (e.g., audio or visual communications, telephonic calls, etc.) or the like associated with an enterprise system. For example, the secure server may act as an intermediary between a first client device operated by a user of an enterprise system and a second client device operated by an agent of the enterprise system, where the agent is providing assistance to the user. In various embodiments, the secure server may be configured to support or establish secure connections with client devices via components. For example, to facilitate a customer support call between a first client device operated by a user and a second client device operated by an agent, the secure server may establish a secure connection to a user component associated with the first client device and another secure connection to an agent component associated with the second client device to act as an intermediary.

In some embodiments, the secure server may establish a secure connection in response to a request (e.g., a request for a secure connection from a user component or agent component), another secure connection (e.g., establishing a secure connection with an agent component in response to a secure connection with a user component), or the like. In an example, the secure server may establish a secure connection with a user component (e.g., responsive to a request initiated by the user component) and subsequently (or in parallel) establish a secure connection with an agent component to facilitate digital transmissions between the two components. In various embodiments, the secure server may establish one or more secure connections sequentially, in parallel, in any order, or responsive to any associated entity (e.g., any component, client device, the secure server, etc.).

In some embodiments, the secure server may include or otherwise be associated with a masking engine. In various embodiments, the secure server may be configured to apply the masking engine to images to generate masked images. For example, the secure server may apply the masking engine while facilitating a screen sharing session to generate masked images from images received from a user component and transmit the masked images to an agent component to provide improved security (e.g., to mask sensitive text identified within images).

As used herein, the term "component" refers to a system unit configured to facilitate one or more functionalities of an enterprise system. In some embodiments, a component may refer to software functionality executed by one or more particular hardware elements, including a software program application or aspect of a software program application executed by one or more processors. The processors may be part of a client device, a secure server, or a third party computing device (e.g., local, remote, cloud based, or similar processing configurations). For example, a component may include a unit of software that facilitates one or more functionalities of a software program of an enterprise system, which unit may be executed by one or more corresponding units of hardware. For example, in some embodiments, a component may include one or more software development kits (SDKs), libraries, software packages, APIs, or the like, that may be included within or as an add-on to a software program application (e.g., a mobile application, computer program, or the like), web site, web browser (e.g., software executed through a web browser), or the like. In various embodiments, a component may be stored on a remote server (e.g. the secure server) and accessed remotely, such as through a web browser, downloaded to an on-device memory and accessed locally, such as a software program application, combinations thereof, or the like. In various embodiments, a component may be configured for a particular operating system such as IOS, ANDROID, WINDOWS, MACOS, LINUX, CHROME OS, or the like.

In various embodiments, a component may include one or more other components (also referred to as sub-components) comprising any one or more of the various functionalities described herein. For example, a component may include one or more specialized components configured to perform one or more functionalities of the component such as, for example, a library configured for managing secure connections (e.g., establishing secure connections, transmitting and receiving data via established secure connections, terminating secure connections, monitoring bandwidth, etc.), managing images (e.g., capturing images, preprocessing images, encrypting images, decrypting images, etc.), managing image playback (e.g., playing images received as video), managing agent feedback data (e.g., capturing and transmitting agent feedback data), managing graphical user interfaces (e.g., indicating screen sharing is ongoing, rendering agent feedback data, detecting changes in graphical user interfaces, etc.) or the like.

In some embodiments, a component may be associated with a client device, functionality, software program, or the like, and be referred to using corresponding terminology. Examples of such include, but are not limited to, a user component associated with a client device operated by a user, an agent component associated with a client device operated by an agent, a connection component configured for managing secure connections (e.g., client connection component, server connection component, etc.), an image component configured for capturing, processing, and receiving images and rendering image playback (e.g., a series of images as video), or the like. In some embodiments, a component or portion thereof associated with a particular client device may be stored and executed locally on the client device (e.g., via a processor and memory of the client device). In some embodiments, a component or portion thereof associated with a particular client device may be stored or executed remotely. In some embodiments, a component or portion thereof may cause display of a graphical user interface or one or more portions of a graphical user interface on the client device.

In some embodiments, a component may be designed to be interactive or facilitate interactivity such as by causing client devices to transmit and receive data to and from the secure server, and by extension, each other (e.g., programmatically instructing one or more components of the client device or otherwise associated with the client device to transmit or receive information). For example, to facilitate a screen sharing session between two client devices, a corresponding user component may establish a secure connection with the secure server and the secure server may establish a secure connection with a corresponding agent component such that the user component and the agent component may be in communication via the secure server. In other examples, such a set of secure connections (e.g., the secure connection between the user component and the secure server and the secure connection between the secure server and the agent component) may be established sequentially, in parallel, in any order, or initiated by any entity (e.g., any component, client device, the secure server, etc.). In some examples, a secure connection may need to be approved by an operator of a client device before the secure connection may be established. For example, a user may be required to authorize a secure connection initiated by an agent or an agent may be required to authorize a secure connection initiated by a user (e.g., by providing authorizing input at a corresponding client device).

In some embodiments, a component (e.g., a user component) may be configured to capture images of a graphical user interface displayed at a client device and transmit the captured images to the secure server. In some embodiments, a component may be configured to capture images based on one or more parameters or conditions. For example, in some embodiments, a component may be configured to capture screenshots in response to or based on detected changes in a graphical user interface or user inputs, bandwidth measures, time intervals, combinations thereof, or the like.

In some examples, to detect changes in a graphical user interface or user inputs and capture images in response, a component may be configured to perform screen monitoring (e.g., comparing screenshots captured at different times using a computer vision analysis to detect changes in the screenshots), document object model monitoring to detect changes in a web page, key press monitoring to detect user activity, file system monitoring to monitor changes in files or directories, or use custom hooks, callbacks, or listeners to detect specific events in applications or user inputs, or the like. For example, using such techniques, a component may be configured to capture an image in response to a user navigating to a new page within an application, cursor movement, screen touches, or the like. In some examples, a component may be configured to ignore cursor movement or screen touches that do not cause new content to be displayed on the graphical user interface (e.g., a user simply moving a cursor around a screen but not navigating to new pages or substantively interacting with an application). Additionally or alternatively, in some embodiments, a component (e.g., a user component) may monitor a bandwidth available to the respective client device, the secure server, or the like, and, for example, decrease the frequency of image captures in response to lesser bandwidth or increase the frequency of image captures in response to greater bandwidth. Additionally or alternatively, in some embodiments, a component (e.g., a user component) may capture images continuously (e.g., 10, 30, 60, etc., times per second) or periodically (e.g., one image per second, two images per second, one image per two seconds, at least one image per five seconds, no more than two images per second, etc.) In various embodiments, combinations of such techniques may be used. For example, in one configuration, a component may be configured to capture an image continuously when a bandwidth measure satisfies a first threshold and per two seconds when a bandwidth measure satisfies a second threshold as well as in response to any detected changes in a graphical user interface. In another example configuration, a component may be configured to capture images in response to detected changes in a graphical user interface, no more than once per second, and at least once every ten seconds. In other examples, any combination of such techniques or logic may be applied. In some embodiments, the parameters or conditions according to which the user component captures images may be provided or determined by the secure server. For example, the secure server may be configured to determine a frequency, one or more conditions, a bandwidth measure, or the like, corresponding to when the user component should capture images and provide such information or control signals to the user component causing the user component to capture images accordingly.

In some embodiments, a component (e.g., an agent component) may be configured to receive one or more images (e.g., masked images) from the secure server and display the one or more images via a corresponding client device. For example, images captured of a graphical user interface may be transmitted to a component by the secure server and displayed to an agent such that the agent may observe the same graphical user interface as a user (with the exception of any masking). The component may cause "display" of the various images, interfaces, and the like described herein by programmatically instructing the client device to display the described visuals.

In some embodiments, a component (e.g., an agent component) may be configured to display images as video. For example, a component may display received images in an order and timing corresponding to their capture to provide real-time video playback of a corresponding graphical user interface as it was displayed at a client device. In another example, a component may display images in an order corresponding to their capture but based on a different timing (e.g., with a buffer between images, reduced timing between images, etc.) to improve a viewing experience (e.g., for smoother playback, to allow more time for observation, etc.). In some examples, a component may display images as video such that an agent may selectively scrub through the video to observe different images as desired (e.g., rewind, pause, fast forward, etc.). In some embodiments, a component may be configured to capture, process, or transmit agent feedback data.

As used herein, the term "agent feedback data" refers to data captured or provided by a component (e.g., an agent component) representative of inputs by an agent. For example, agent feedback data may include or otherwise be associated with location data (e.g., the location of a cursor or pointer with respect to a graphical user interface), input or action data (e.g., certain buttons or navigational actions with respect to a graphical user interface), text data (e.g., a message), audio data (e.g., recorded audio of an agent speaking), image data (e.g., images of an agent captured via a camera, annotated images, etc.), or the like. In various embodiments, agent feedback data may be indicative of feedback an agent wishes to provide to an individual (e.g., a customer) during live support calls or live image sharing (e.g., a live screen sharing session). In some embodiments, an agent component may be configured to capture agent feedback data based on one or more inputs or actions detected at a client device operated by an agent and transmit the agent feedback data to the secure server for transmission to a corresponding user component. In various embodiments, agent feedback data may be transmitted directly to a user component or another client device (e.g., the client device of a customer).

In some embodiments, agent feedback data may include images. For example, an agent may edit or annotate an image (e.g., a masked image) via one or more input devices or processes associated with a client device (e.g., touch screen input, stylus input, keyboard input, cursor input, etc.). In some embodiments, agent feedback data may facilitate various remote control functionalities associated with the client device of an agent controlling one or more input devices or the like, at another client device (e.g., the client device of a customer). For example, in some embodiments, agent feedback data may include the location of a cursor or pointer associated with a client device operated by the agent. For example, during a live screen sharing session between an agent client device and a customer client device, the agent component may be configured to capture cursor data (e.g., location or movement data) of a cursor operated by the agent and transmit the cursor data to the user component configured to render a corresponding cursor at the customer client device. An agent can pin point locations on a graphical interface which may be converted into graphical information for the user to view. For example, (x,y) coordinate data may be captured representative of where a cursor operated by an agent is positioned relative to a graphical user interface and such (x,y) coordinate data may be transmitted to a user component configured to render a corresponding cursor, overlay a corresponding graphical element, or the like on the graphical user interface associated with the user component. In this manner, in some embodiments, the agent may be able to remotely control a cursor, pointer (e.g., a cursor with disabled click input so the agent may only move the cursor), or the like, such that the agent may point things out to the user or otherwise direct the user with visual cues. In various embodiments, an enterprise system may provide for synchronized applications accessed by an agent component and user component. For example, an agent, via an enterprise computer, may access a first graphical user interface representative of and synched to a second graphical user interface displayed at a client device of a customer such that the agent may, for example, select a button within the first graphical user interface, and in response, a corresponding button within the second graphical user interface may provide indication of the selected button (e.g., by highlighting the button such that the agent may direct the user to select the button with visual cues associated with the graphical user interface the user sees at their device).

As used herein, the terms "connection" or "secure connection" refer to a transmission channel for data. A secure connection may be established using one or more software or hardware elements. In some embodiments, a secure connection may include a full-duplex transmission channel. For example, a secure connection may be any communication channel configured to simultaneously transmit and receive data between two or more computing entities. An example embodiment of a secure connection includes, but is not limited to, a WebSocket connection. In various embodiments, a secure connection may be used to facilitate a screen sharing session between two client devices and as such, may be used to transmit images, video, text data, audio, agent feedback data, or the like. Secure connections may include wired or wireless secure connections with one or more network intermediaries or intermediary devices (e.g., a secure server).

In some embodiments, two or more secure connections may be associated via the secure server. For example, a first secure connection may be established between a first client device and the secure server, and a second secure connection may be established between a second client device and the secure server, and the first secure connection and the second secure connection may be associated such that data transmitted over the first secure connection (or data derivative therefrom) may be transmitted over the second secure connection (e.g., relayed by the secure server). In this manner, in various embodiments, a secure connection between two client devices may be established indirectly via two associated secure connections to the secure server. In some embodiments, establishing a secure connection may be performed responsive to a request, another secure connection, or the like. For example, a component such as a user component may transmit a request for a secure connection with an agent component. Responsive to this request, a first secure connection may be established between the user component and the secure server, and a second secure connection may be established between the agent component and the secure server, and the two secure connections may be associated.

In an example embodiment, a component such as a user component may initiate a secure connection with the secure server, for example, by transmitting a request to the secure server (e.g., an HTTP request with an upgrade header to initiate a WebSocket handshake). Continuing this example, the secure server may listen for requests for secure connections (e.g., listening to specific ports for incoming Web-Socket connection requests or other types of requests or secure connections) and, in response to receiving the request for secure connection (and a successful handshake), respond to the requesting user component confirming the secure connection. Once the secure connection is established, the secure server and the user component may each transmit and receive data (e.g., text frames, binary frames, control frames, ping frames, pong frames, etc.) simultaneously or at any time until the secure connection is terminated (e.g., by either entity sending a close frame). In other example embodiments, the secure server may be the requesting entity and a component may listen for requests in a similar manner. This example is merely intended as one possible manner in which a secure connection may be established and, in various embodiments, other steps or techniques may be used to establish different secure connections.

As used herein, the term "graphical user interface" refers to a representation of a software interface. For example, a graphical user interface may be the visual representation of a software such as a website, mobile application, desktop application, or the like, that may be used to generally interface with the software. By way of example, images, buttons, links, backgrounds, text fields, or the like, may be included within or make up a graphical user interface. In various examples, a graphical user interface may be configured for display on one or more screens (e.g., a screen of a mobile phone, a personal computer, or the like). In some examples, a graphical user interface may include sensitive text. In various examples, a graphical user interface may be monitored, for example, by a component, to capture images representative of at least a portion of the graphical user interface.

As used herein, the term "machine learning model" refers to one or more processes, algorithms, or other data entity that describes parameters, hyper-parameters, defined operations, or defined mappings of a model that is configured to process one or more inputs in accordance with one or more trained parameters of the machine learning models in order to generate a prediction. An example of a machine learning model is a mathematically derived algorithm (MDA). An MDA may comprise any algorithm trained using training data to predict one or more outcome variables. Without limitation, an MDA, as used herein, may comprise machine learning frameworks including neural networks, deep neural networks, generative adversarial networks, convolutional neural networks, recurrent neural networks, large language models, generative pre-trained transformers (GPT), support vector machines, gradient boosts, decision trees, random forests, Markov models, diffusion models, adaptive Bayesian techniques, statistical models, or the like. Additionally, and without limitation, an MDA, as used in the singular, may include ensembles using multiple machine learning or statistical techniques.

As used herein, the term "repository," "database," and similar terms may be used interchangeably to refer to a computing location associated with a system where data is stored, accessed, modified, and otherwise maintained by the system. A repository may be used to store data in association with a data storage protocol or a query language. In certain embodiments, a repository may embody a data storage device or devices, a separate database server or servers, or as a combination of data storage devices and separate database servers. Further, in some embodiments, a repository may be embodied as a distributed repository such that some of the stored data is stored centrally in a location within the repository and other data stored in a single remote location or a plurality of remote locations. Alternatively, in some embodiments, a repository may be distributed over a plurality of remote storage locations only such as in a cloud storage environment.

As used herein, the terms "data," "content," "digital content," "information," and similar terms may be used interchangeably to refer to data capable of being transmitted, received, or stored in accordance with embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, or the like, sometimes referred to herein as a "network," which may include networks of networks, such as the internet. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, or the like.

As used herein, the term "circuitry" refers to particular hardware configured to perform the functions associated with the particular circuitry as described herein. In some embodiments, circuitry may be used as part of (a) hardware-only circuit implementations (e.g., implementations in analog circuitry or digital circuitry); (b) combinations of circuits and computer program product(s) comprising software or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. In some embodiments, "circuitry" may include processing circuitry, storage media, network interfaces, input/output devices, or the like. As a further example, as used herein, the term "circuitry" also includes an implementation comprising one or more processors or portion(s) thereof and accompanying software or firmware. As another example, the term "circuitry" as used herein also includes, for example, a baseband integrated circuit or applications processor integrated circuit for a mobile phone or a similar integrated circuit in a server, a cellular network device, other network device, or other computing device.

As used herein, a "computer-readable storage medium," refers to a physical storage medium (e.g., volatile, or non-volatile memory device), and may be differentiated from a "computer-readable transmission medium," which refers to an electromagnetic signal.

As used herein, the term "access" refers to the ability to receive, retrieve, view, make available, make use of, or the like, various data associated with embodiments described herein.

System Architecture

Embodiments of the present disclosure may be implemented in various ways, including as computer program products that comprise articles of manufacture, as hardware, including circuitry, configured to perform one or more functions, or as combinations of specific hardware and computer program products. Such computer program products may include one or more software units including, for example, software objects, methods, data structures, or the like. A software unit may be coded in any of a variety of programming languages. An illustrative programming language may be a lower-level programming language such as an assembly language associated with a particular hardware architecture or operating system platform. A software unit comprising assembly language instructions may require conversion into executable machine code by an assembler prior to execution by the hardware architecture or platform. Another example programming language may be a higher-level programming language that may be portable across multiple architectures. A software unit comprising higher-level programming language instructions may require conversion to an intermediate representation by an interpreter or a compiler prior to execution.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software units. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Other examples of programming languages include, but are not limited to, a macro language, a shell or command language, a job control language, a script language, a database query, or search language, or a report writing language. In one or more example embodiments, a software unit comprising instructions in one of the foregoing examples of programming languages may be executed directly by an operating system or other software element without having to be first transformed into another form. A software unit may be stored as a file or other data storage construct. Software units of a similar type or functionally related may be stored together, such as in a particular directory, folder, or library. Software units may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, or the like (also referred to herein as executable instructions, instructions for execution, computer program products, program code, or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, or the like. Such a non-volatile computer-readable storage medium may also include read-only memory (ROM), programmable read-only memory (PROM), crasable programmable read-only memory (EPROM), electrically crasable programmable read-only memory (EEPROM), flash memory (e.g., Serial, NAND, NOR, or the like), multimedia memory cards (MMC), secure digital (SD) memory cards, SmartMedia cards, CompactFlash (CF) cards, Memory Sticks, or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as one or more methods, apparatuses, systems, computing devices (e.g., user devices, servers, etc.), computing entities, or the like. As such, embodiments of the present disclosure may take the form of an apparatus, system, computing device, computing entity, or the like executing instructions stored on one or more computer-readable storage mediums (e.g., via the aforementioned software units and computer program products) to perform certain steps or operations. Thus, embodiments of the present disclosure may also take the form of an entirely hardware embodiment, an entirely computer program product embodiment, or an embodiment that comprises combination of computer program products and hardware performing certain steps or operations.

Embodiments of the present disclosure are described below with reference to block diagrams, flowchart illustrations, and other example visualizations. It should be understood that each block of the block diagrams and flowchart illustrations may be implemented in the form of a computer program product, an entirely hardware embodiment, a combination of hardware and computer program products, or apparatuses, systems, computing devices, computing entities, or the like carrying out instructions, operations, steps, and similar words used interchangeably (e.g., the executable instructions, instructions for execution, program code, or the like) on a computer-readable storage medium for execution. For example, retrieval, loading, and execution of code may be performed sequentially such that one instruction is retrieved, loaded, and executed at a time. In some example embodiments, retrieval, loading, or execution may be performed in parallel such that multiple instructions are retrieved, loaded, or executed together. Thus, such embodiments may produce specifically configured machines performing the steps or operations specified in the block diagrams and flowchart illustrations. In embodiments in which specific hardware is described, it is understood that such specific hardware is one example embodiment and may work in conjunction with one or more apparatuses or as a single apparatus or combination of a smaller number of apparatuses consistent with the foregoing according to the various examples described herein. Accordingly, the block diagrams and flowchart illustrations support various combinations of embodiments for performing the specified instructions, operations, or steps.

In this regard, FIG. 1 shows an example system environment 100 within which at least some embodiments of the present disclosure may operate. The depiction of the example system environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1 and the system environment 100 disclosed therein is merely presented to provide an example basis and context for the facilitation of some of the features, aspects, and uses of the methods, apparatuses, computer readable media, and computer program products disclosed and contemplated herein.

With reference to FIG. 1, the depicted example system environment 100 includes a secure server 120, the client device 102, and the client device 106. The depicted secure server 120 includes the server connection 122 and the masking engine 126 configured to perform one or more functionalities of the secure server 120. The masking engine 126 may include the OCR model 126a, classification model 126b, and image processing model 126c configured to perform one or more functionalities of the masking engine 126. The depicted user client device 102 includes the user component 104 configured to perform one or more functionalities of the client device 102. The user component 104 may include the client connection component 104a and image component 104b, which collectively may be configured to perform one or more functionalities of the user component 104. For example, the user component 104 may establish the first secure connection 102a (e.g., via the client connection component 104a) with the secure server 120 (e.g., via the server connection 122). Similarly, the depicted agent client device 106 includes the agent component 108 configured to perform one or more functionalities of the client device 106. The agent component 108 may include the client connection component 108a and image component 108b which collectively may be configured to perform one or more functionalities of the agent component 108. For example, the agent component 108 may establish the second secure connection 106a (e.g., via the client connection component 108a) with the secure server 120 (e.g., via the server connection 122). In some embodiments, one or more other components or sub-components may be used to perform any of the functionalities disclosed herein.

It will be understood that while many of the aspects and elements presented in FIG. 1 are shown as discrete, separate elements, other configurations may be used in connection with the methods, apparatuses, computer readable media, and computer programs described herein, including configurations that combine, omit, separate, or add aspects or elements. For example, in some embodiments, the functions of one or more of the illustrated elements in FIG. 1 may be performed by a single computing device or by multiple computing devices, which devices may be local or cloud based. It will be appreciated that the various functions performed by the secure server 120 or the client device(s) 102 or 106 may be embodied by a single apparatus, subsystem, or system comprising one or more sets of computing hardware (e.g., processor(s) and memory) configured to perform various functions thereof. In some embodiments, one or more intermediary devices may be positioned in electrical communication between the depicted system elements (e.g., the first secure connection 102*a* or second secure connection 106*a* may be facilitated by various intermediary networking hardware or software elements).

In some embodiments, the user component 104 or agent component 108 may be associated with or accessed via a platform, such as a mobile application platform or a web application platform for access by an operator of a respective client device 102 or 106. For example, the user component 104 or agent component 108 may be available as a software unit of an application (e.g., a mobile application, web based application, etc.) installed at a respective client device 102 or 106, as an extension of a website, as an individual component accessed via the secure server 120 (e.g., as software units available for download, software units accessible through a network, etc.). In this regard, the mobile application platform may be accessed by a client device 102 or 106 via an application installed in the client device 102 or 106. Further, the web application platform may be accessed by a client device 102 or 106 via a web browser, mobile browser application (e.g., a Wireless Application Protocol browser), or the like. In some embodiments, the user component 104 or agent component 108 or portions thereof (e.g., one or more sub components such as the client connection component 104*a* or 108*a* or image component 104*b* or 108*b*) may be embodied by or executed via a respective client device 102 or 106. For example, one or more software packages may be downloaded to a respective client device 102 or 108 and configured to perform the functions of one or more components of the user component 104 or agent component 108 via a memory or processor of the respective client device 102 or 108. In some embodiments, the user component 104 or agent component 108 or portions thereof (e.g., one or more sub components such as the client connection component 104*a* or 108*a* or image component 104*b* or 108*b*) may be embodied by one or more portable data storage devices, one or more platforms (e.g., mobile application platform, web application platform, etc.), or some combination thereof.

In some embodiments, a client device 102 or 106 is an electronic computing device that may be used by an operator for any of a variety of purposes including, but not limited to, one or more of sending or receiving signals, storing data, displaying data, viewing data, or live screen sharing. For example, the client devices 102 and 106 may be capable of, but not limited to, one or more of displaying graphical user interfaces and other graphical representations on the screens of the client devices 102 and 106, receiving operator input that directly or indirectly triggers secure connections to the secure server 120, or delivering or receiving images of graphical user interfaces or other graphical representations to or from the secure server 120 or other computing device.

A client device 102 or 106 may include computer hardware or software configured to perform one or more functionalities associated with the client device(s) 102 or 106 described herein. In some embodiments, the client device 102 or 106 may be a mobile device. The mobile device may be a client device that is capable of being held and transported by an operator. Example mobile devices include, but not limited to, smart phones, tablet computers, laptop computers, wearables, laptop computers, elements or devices interacting with such devices (e.g., web cams, microphones, etc.), or the like. In some embodiments, the client device 102 or 106 may be a personal computer, terminal, or enterprise computer usable for interacting with the secure server 120 or other client devices (e.g., via the secure server 120 or direct communication). In various embodiments, a client device 102 or 106 may be a device owned by or otherwise assigned to the operator (e.g., a personal mobile phone, tablet, laptop, desktop computer, elements or other related devices, etc.). The client device 102 or 106 may use (e.g., access or install) one or more computer program products (e.g., a mobile application platform, desktop computer application platform) configured to provide one or more functionalities of the user component 104 or agent component 108 respectively. In some embodiments, one or more computer program products configured to provide one or more functionalities of the user component 104 or agent component 108 may be configured in association with a type of the respective client device 102 or 106 or operating system the respective client device 102 or 106. For example, the client device 102 using an application configured to provide one or more functionalities of the user component 104 may be a smartphone using a mobile application, a program installed on a personal computer, a web browser or other temporarily loaded software functionality, or the like; a desktop computer using a desktop application; or the like. In various embodiments, a computer program product configured to provide one or more functionalities of the user component 104 or agent component 108 may be configured to operate with one or more types of client devices 102 or 106 or one or more operating systems.

In some embodiments, the secure server 120 may be accessible (e.g., via server connection 122) to transmit or receive data with the client device 102 (e.g., via the client connection component 104*a*) and the client device 106 (e.g., via the client connection component 108*a*). In such an example, secure server 120 may provide access for communication between the client device 102 and the client device 106 (e.g., to facilitate a live screen sharing session and other live communications).

In some embodiments, the user component 104 or one or more components thereof may be accessed by a client device 102. In various embodiments, the user component 104 or one or more components thereof may be a computer executable program and installed at the client device 102. In some embodiments, the user component 104 or one or more components thereof may be a computer executable program and accessed via a network (e.g., a cloud-based computer executable program).

In some embodiments, the agent component 108 or one or more components thereof may be accessed by a client device 106. In various embodiments, the agent component 108 or one or more components thereof may be a computer executable program and installed at the client device 106. In some embodiments, the agent component 108 or one or more components thereof may be a computer executable program and accessed via a network (e.g., a cloud-based computer executable program).

The various functions of the system environment 100 may be performed by other arrangements of one or more computing devices or computing systems without departing from the scope of the present disclosure. In some embodiments, a computing system may comprise one or more computing devices (e.g., server(s)). For example, in an embodiment, one or more functions of the client device 102 or user component 104 may be performed by a single computing device or computing system, or by multiple computing devices, which devices may be local or cloud based. In an embodiment, one or more functions of the secure server 120 may be performed by a single computing device or computing system, or by multiple computing devices, which devices may be local or cloud based. In some embodiments, two or more of the depicted devices may be part of a single system or device. For example, the agent client device 106 and secure server 120 may be part of the same local networked system or part of the same computing system (e.g., client device 106 may be a terminal or other front end portion associated with the secure server 120 or a larger system that includes both the secure server and the client device). In some such embodiments, the respective secure connections (e.g., first secure connection 102*a* or second secure connection 106*a*) may be internal connections within a single computing device or set of computing devices within a larger system (e.g., a local or cloud based system). For example, in some embodiments, the client device 106 may comprise a computer terminal accessible by an agent and the functionalities associated with some or all of the masking engine 126 or agent component 108 may be performed on one or more computing devices in electrical communication (e.g., remote or local communication) with the terminal. In some embodiments, two or more of the depicted devices may be physically or electronically remote from each other (e.g., connected via the Internet). It will be appreciated that the various functions performed by two or more of the masking engine 126, OCR model 126*a*, classification model 126*b*, or image processing model 126*c* may be performed by a single apparatus, subsystem, or system. For example, two or more of the masking engine 126, OCR model 126*a*, classification model 126*b*, or image processing model 126*c* may be embodied by a single apparatus, subsystem, or system comprising one or more sets of computing hardware (e.g., processor(s) and memory) configured to perform various functions thereof.

The various elements illustrated in the system environment 100 may be configured to communicate via one or more communication mechanisms, including wired or wireless connections, such as over a network, bus, or similar connection. For example, a network may include any wired or wireless communication network including, for example, a wired or wireless local area network (LAN), personal area network (PAN), metropolitan area network (MAN), wide area network (WAN), or the like, as well as any hardware, software or firmware required to implement it (such as, e.g., network routers, etc.). For example, the network may include a cellular telephone, an 802.11, 802.16, 802.20, or WiMAX network. Further, a network may include a public network, such as the Internet, a private network, such as an intranet, or combinations thereof, and may utilize a variety of networking protocols now available or later developed including, but not limited to TCP/IP based networking protocols.

In various embodiments, the elements depicted in FIG. 1 as being included in the client device 102, secure server 120, or client device 106, although not required to be an integral system, may be connected via one or more networks. In some embodiments, one or more APIs may be leveraged to communicate with or facilitate communication between one or more of the elements illustrated in the client device 102, secure server 120, or client device 106 and system environment 100.

Example System Operation

Using the various elements and techniques described herein, the secure server 120 may be configured to establish the first secure connection 102*a* with the user component 104. In some embodiments, the secure server 120 may receive a request from the user component 104 to establish the first secure connection 102*a*, or the secure server 120 may transmit a request to establish the first secure connection 102*a* to the user component 104. The secure server 120 may be configured to establish the second secure connection 106*a* with the agent component 108. In some embodiments, the secure server 120 may transmit a request to establish the second secure connection 106*a* to the agent component 108, or the secure server 120 may receive a request from the agent component 108 to establish the second secure connection 106*a*. In various embodiments, an initial electronic request for initiating an image sharing session (e.g., including establishing the first secure connection 102*a* and second secure connection 106*a*) may be generated by any of the client devices 102, 106 or secure server 120. In some embodiments, the image sharing session initiation may be triggered concurrent with or otherwise automatically in response to a support call (e.g., as a standard support call feature). In some embodiments, the image sharing session initiation may be triggered ad hoc in response to a user interface selection by users (e.g., the user or agent) of either client device 102, 106 with or without requiring a corresponding selection (e.g., acceptance of a request shown in a pop-up) by the other user of the other client device. In some embodiments, the image sharing session initiation may be triggered based upon one or more related functionalities triggered during the support call (e.g., when escalating to a live customer support representative, when running other remote diagnostics, etc.).

In some embodiments, the first secure connection 102*a* may include a two-way connection channel configured to, in real time, transmit input data detected at the client device 102 or data derivative therefrom, to the secure server 120 and receive input data detected at the client device 106 or data derivative therefrom, from the secure server 120. Similarly, in some embodiments, the second secure connection 106*a* may include a two-way connection channel configured to, in real time, transmit input data detected at the client device 106 or data derivative therefrom, to the secure server 120 and receive input data detected at the client device 102 or data derivative therefrom, form the secure server 120.

Although shown as the first secure connection 102*a* and second secure connection 106*a*, it should be appreciated that in various embodiments either secure connection may be established first relative to the other secure connection or that the two secure connections may be established in parallel. Regardless of the specific manner in which the first secure connection 102*a* and the second secure connection 106*a* are established, the secure server 120 may use the first secure connection 102*a* and the second secure connection 106*a* between the client device 102 and the client device 106 (e.g., relaying data received or data derivative therefrom from one secure connection to the other secure connection).

In some embodiments, the secure server 120 may relay all data transmitted (or data derivative therefrom) between the client device 102 and the client device 106, or, in some embodiments, the secure server 120 may only relay a subset of data transmitted (or data derivative therefrom) between the client device 102 and the client device 106. For example, in the context of a live call including live screen sharing between the client device 102 and the client device 106, the secure server 120 may receive and relay all data transmitted between the client devices 102 and 106 (e.g., text data, audio data, video data, image data, etc.), or, in some embodiments, the secure server 120 may only receive and relay a subset of data transmitted between the client devices 102 and 106 (e.g., only image data associated with the live screen sharing such as images and masked images), with other data being transmitted via other means (e.g., a separate voice server; an Internet-based, cellular, or other phone call via a third party network; etc.). In this manner, in some embodiments, the client device 102 and client device 106 may be associated with a direct connection or a partly direct connection in addition to the connection via the secure server 120. For example, in some embodiments, another service may be used to facilitate a live support call (or other type of connection) where the client device 102 and the client device 106 are in direct or indirect connection in association with the another service, and in indirect communication via the secure server 120 for the purpose of live image sharing with the benefit of the masking techniques described herein.

The secure server 120 may include the server connection 122. In some embodiments, the server connection 122 may be a software unit (e.g., a sub-component), or hardware unit with enabling software configured to perform one or more of the functionalities of the secure server 120. For example, the server connection 122 may be configured to establish and manage connections with client devices 102 and 106. For example, the server connection 122 may be configured to manage the first secure connection 102a and the second secure connection 106a (e.g., transmitting or receiving a request for secure connection, performing a handshake to establish the secure connection, transmitting or receiving data over the secure connection, terminating the secure connection, etc.)

The user component 104 may include the client connection component 104a. In some embodiments, the client connection component 104a may be a sub-component of the user component 104 configured to perform one or more functionalities of the user component 104. For example, the client connection component 104a may be configured to establish and manage connections with the secure server 120. For example, the client connection component 104a may be configured to manage the first secure connection 102a (e.g., transmitting or receiving a request for secure connection, performing a handshake to establish the secure connection, transmitting or receiving data over the secure connection, terminating the secure connection, etc.).

The agent component 108 may include the client connection component 108a. In some embodiments, the client connection component 108a may be a sub-component of the agent component 108 configured to perform one or more functionalities of the agent component 108. For example, the client connection component 108a may be configured to establish and manage connections with the secure server 120. For example, the client connection component 108a may be configured to manage the first secure connection 102a (e.g., transmitting or receiving a request for secure connection, performing a handshake to establish the secure connection, transmitting or receiving data over the secure connection, terminating the secure connection, etc.).

In this manner, in some embodiments, the server connection 122, client connection component 104a, and client connection component 108a may be complementary sub-components or the like configured to establish and manage the secure connections of various embodiments described herein. For example, using the various elements of the system environment 100 and techniques described herein, example embodiments may establish the first secure connection 102a between the user component 104 and the secure server 120 and establish the second secure connection 106a between the agent component 108 and the secure server 120. In some embodiments described herein, transmitting or receiving various data between the client device 102, secure server 120, and client device 106, may be understood as transmitting and receiving data via the client connection component 104a (or user component 104), server connection 122, and client connection component 108a (or agent component 108) respectively.

The user component 104 may include the image component 104b. In some embodiments, the image component 104b may be a sub-component of the user component 104 configured to perform one or more of the functionalities of the user component 104. For example, the image component 104b may be configured to capture, process, encrypt, transmit, receive, or generally manage images. For example, the image component 104b may be configured to capture images such as screenshots of a graphical user interface or portion thereof displayed via a screen of the client device 102. In some embodiments, the image component 104b (or another sub-component of the user component 104) may be configured to encrypt the images, capture the images in response to one or more triggers (e.g., user input, changes in the graphical user interface, a time interval, etc.), preprocess the images (e.g., down sample the images, encode the images for transmission, etc.), or the like. In various embodiments, the sub-components of the user component 104 (e.g., the client connection component 104a and the image component 104b) may be communicatively coupled. In this manner, images captured by the image component 104b of various embodiments may be transmitted via the client connection component 104a to the secure server 120 (e.g., via the first secure connection 102a). Said differently, in some embodiments, the user component 104 (e.g., via the client connection component 104a and image component 104b) may be configured to transmit, to the secure server 120 and via the first secure connection 102a, an image representative of at least a portion of a graphical user interface displayed at the client device 102.

In some embodiments, the graphical user interface or portion thereof may include sensitive text. Accordingly, an image representative of the graphical user interface or portion thereof (e.g., captured and transmitted by the user component 104 to the secure server 120) may include sensitive text. In various embodiments, sensitive text may be masked to avoid the exposure of the sensitive text. As further described herein, the user component 104 may additionally encrypt the image including sensitive text prior to sending to the secure server 120.

In some embodiments, the secure server 120 may be configured to apply an image to the masking engine 126, for example, to mask sensitive text. The masking engine 126 of various embodiments may be configured to generate a masked image by masking at least the sensitive text contained within the image. In some embodiments, the masking engine 126 may include the OCR model 126a, the classification model 126b, and the image processing model 126c configured to collectively generate a masked image by extracting text from an image, identifying the extracted text and sensitive text (or non-sensitive text), and masking the sensitive text. For example, the OCR model 126a may include an optical character recognition (OCR) model configured to extract text from the image, including the sensitive text, and location data representative of the location of the extracted text (e.g., (x,y) coordinate data, including position (e.g., x, y), width, and/or height of the text). The extracted text (and location data) from the OCR model 126a may be provided to the classification model 126b configured to classify text extracted from the image, including the sensitive text (e.g., analyze the extracted text and generate predicted classifications indicative of whether the extracted text is sensitive text or non-sensitive text). The image processing model 126c may be configured to mask any regions of the image including text classified as sensitive text, thereby generating a masked image. For example, the image processing model 126c may identify a coordinate location (e.g., (x,y) coordinate data generated by the OCR model 126a) or other unique identification of the location on the image from which the sensitive text originated. Based on the detected location, the image processing model 126c may apply the masking to the location. In some embodiments, the OCR model or another portion of the masking engine may generate the location identifying information prior to, during, or after extracting the text. In some embodiments, the secure server 120 may be configured to transmit, to the agent component 108 and via the second secure connection 106a, the masked image.

In some embodiments, the secure server 120 may be configured to receive a plurality of images from the user component 104. For example, during live image sharing (e.g., a live screen sharing session) a plurality of images may be transmitted over a time interval (e.g., the duration of the live screen sharing session). Accordingly, the secure server 120 may be configured to receive the plurality of images over the time interval, process the images (e.g., apply masking via the masking engine 126), and transmit the masked images to the agent component 108 in real time or near real time. In some embodiments, the secure server 120 may be configured to determine an image received does not need masking or the secure server 120 and may decline to apply masking to an image. As such, the secure server 120 may transmit the original image or an unmasked image to the agent component 108. For example, the secure server 120 may receive an image and determine, based on applying the masking engine 126 to the image, that the image includes no sensitive text, and transmit the image to the agent component 108. In some embodiments, the OCR model 126a may determine that there is no text to extract or fail to extract any text from an image, or the classification model 126b may determine that there is no sensitive text or fail to classify any extracted text as sensitive text (e.g., extracted text that is fed into the classification model may all be classified as "not sensitive"). In this manner, in some embodiments, the secure server 120 may determine that an image includes no sensitive text and transmit the image or an unmasked version of the image to the agent component 108.

In various embodiments, elements of the secure server 120 (e.g., the server connection 122 and the masking engine 126) may be communicatively coupled. In this manner, images received by the secure server 120 may be received via the server connection 122 and the first secure connection 102a, masked using the masking engine 126 to generate a masked image, and the masked image may be transmitted via the server connection 122 and the second secure connection 106a to the agent component 108.

Accordingly, the agent component 108 may be configured to receive, via the second secure connection 106a and client connection component 108a, a masked image. The agent component 108 may include an image component 108b. In some embodiments, the image component 108b may be a sub-component of the agent component 108 configured to perform one or more of the functionalities of the agent component 108. For example, the image component 108b may be configured to capture, process, transmit, receive, or generally manage images. For example, the image component 108b may be configured to receive masked images such as screenshots of a graphical user interface or portion thereof displayed via a screen of the client device 102. In some embodiments, the image component 108b may be configured to display the received masked image on a screen of the client device 106 (e.g., so an operator of the client device 106 may see them). In various embodiments, the image component 108b may be configured to receive a plurality of images (e.g., masked images or unmasked images) and display them as a sequence (e.g., a video). For example, the image component 108b may be configured to display (e.g., cause rendering on a screen associated with the agent client device 106) the received images in sufficiently timed succession to represent the respective graphical user interface displayed at the client device 102 such as in as a real-time screen sharing session. In some embodiments, the image component 108b may be configured to continually cause display of the most recently received image regardless of the timing between image receipts. In some embodiments, the sub-components of the agent component 108 (e.g., the client connection component 108a and the image component 108b) may be communicatively coupled. In this manner, images received by the client connection component 108a of various embodiments may be provided to the image component 108b for playback.

Example Apparatuses of the Disclosure

Having discussed example systems in accordance with the present disclosure, example apparatuses in accordance with the present disclosure will now be described.

Figure 2:
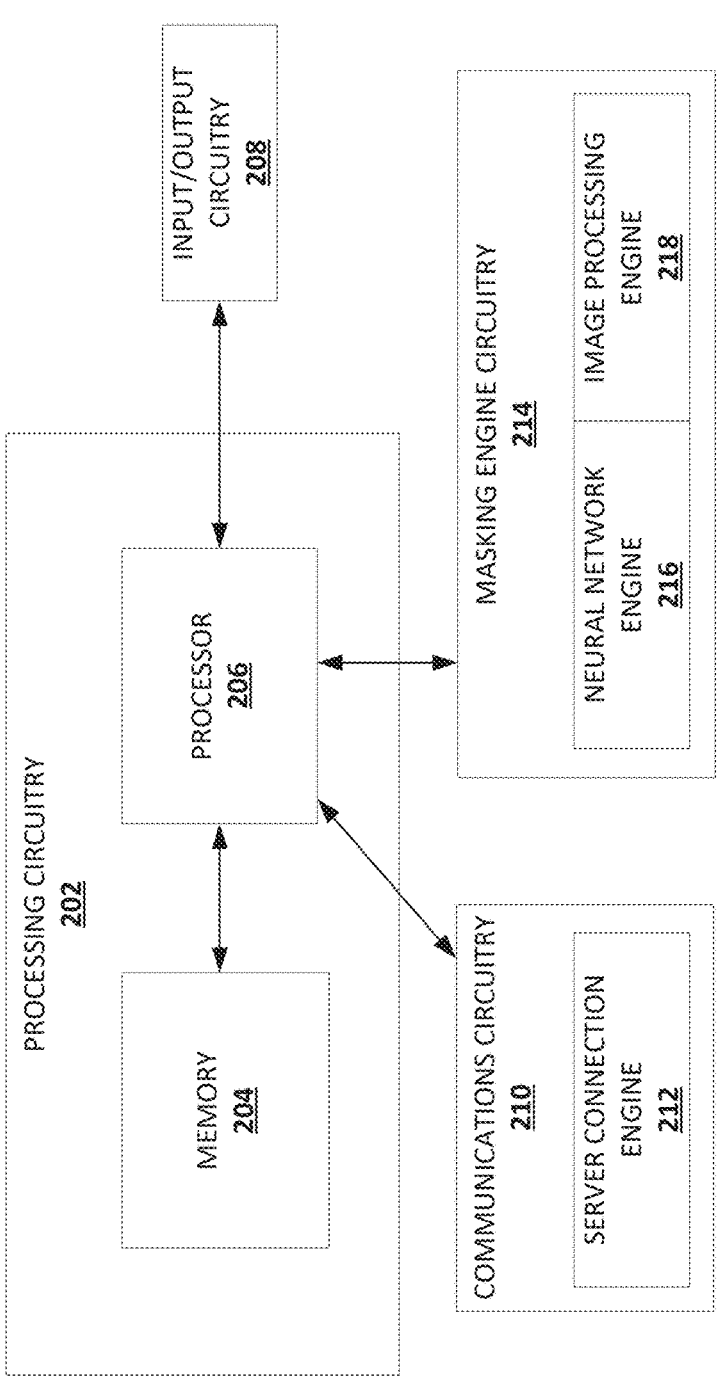
FIG. 2 illustrates a block diagram of an apparatus that may be specifically configured in accordance with various embodiments of the present disclosure and within which at least some embodiments of the present disclosure may operate.

FIG. 2 illustrates a block diagram of an apparatus 200 in accordance with some example embodiments. For example, in some embodiments, the secure server 120 may be embodied by one or more apparatuses 200. In this regard, in some embodiments, the secure server 120 or one or more portions (e.g., one or more individual elements) thereof, if embodied in a particular embodiment, may be embodied by one or more apparatuses 200.

In some embodiments, the apparatus 200 may include a processing circuitry 202 as shown in FIG. 2. It should be noted, however, that the elements illustrated in and described with reference to FIG. 2 below may not be mandatory and thus one or more may be omitted in certain embodiments. Additionally, some embodiments, may include further or different elements beyond those illustrated in and described with reference to FIG. 2. In some embodiments, the functionality of the secure server 120 or any subset thereof may be performed by a single apparatus 200 or multiple apparatuses 200. In some embodiments, the apparatus 200 may comprise one or a plurality of physical devices, including distributed, cloud-based, or local devices.

Although some elements are described with respect to functional limitations, it should be understood that the particular implementations necessarily include the use of particular computing hardware, such as the hardware shown in FIG. 2. It should also be understood that certain of the elements described herein may include similar or common hardware. For example, two sets of circuitries for example, may both leverage use of the same processor(s), network interface(s), storage medium(s), or the like, to perform their associated functions, such that duplicate hardware is not required for each set of circuitry and a single physical circuitry may be used to perform the functions of multiple circuitries described herein. The use of the term "circuitry" as used herein with respect to elements of the apparatuses described herein should therefore be understood to include particular hardware configured to perform the functions associated with the particular circuitry as described herein.

In some embodiments, "circuitry" may include processing circuitry, storage media, network interfaces, input/output devices, or the like. In some embodiments, other elements of the apparatus 200 may provide or supplement the functionality of another particular set of circuitry. For example, the processor 206 in some embodiments provides processing functionality to any of the sets of circuitries, the memory 204 provides storage functionality to any of the sets of circuitry, the communications circuitry 210 provide network interface functionality to any of the sets of circuitry, or the like.

The apparatus 200 may include or otherwise be in communication with processing circuitry 202 that is configurable to perform actions in accordance with one or more example embodiments disclosed herein. In this regard, the processing circuitry 202 may be configured to perform or control performance of one or more functionalities of the apparatus 200 in accordance with various example embodiments, and thus may provide means for performing functionalities of the apparatus 200 in accordance with various example embodiments. The processing circuitry 202 may be configured to perform data processing, application, and function execution, or other processing and management services according to one or more example embodiments. In some embodiments, the apparatus 200 or a portion(s) or elements(s) thereof, such as the processing circuitry 202, may be embodied as or comprise a chip or chip set. In other words, apparatus 200 or the processing circuitry 202 may comprise one or more physical packages (e.g., chips) including materials, elements or wires on a structural assembly (e.g., a baseboard). The structural assembly may provide physical strength, conservation of size, or limitation of electrical interaction for element circuitry included thereon. The apparatus 200 or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 202 may include a processor 206 (or co-processor or any other processing circuitry assisting or otherwise associated with the processor) and, in some embodiments, such as that illustrated in FIG. 2, may further include memory 204. The processing circuitry 202 may be in communication with or otherwise control a user interface (e.g., embodied by input/output circuitry 208) or a communications circuitry 210. As such, the processing circuitry 202 may be embodied as a circuit chip (e.g., an integrated circuit chip) configured (e.g., with hardware, software or a combination of hardware and software) to perform operations described herein.

The processor 206 may be embodied in a number of different ways. For example, the processor 206 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 206 may comprise a plurality of processors. The plurality of processors may be in operative communication with each other and may be collectively configured to perform one or more functionalities of the apparatus 200 as described herein. In some example embodiments, the processor 206 may be configured to execute instructions stored in the memory 204 or otherwise accessible to the processor 206. As such, whether configured by hardware or by a combination of hardware and software, the processor 206 may represent an entity (e.g., physically embodied in circuitry—in the form of processing circuitry 202) capable of performing operations according to embodiments of the present disclosure while configured accordingly. Thus, for example, when the processor 206 is embodied as an ASIC, FPGA or the like, the processor 206 may be specifically configured hardware for conducting the operations described herein. Alternatively, as another example, when the processor 206 is embodied as an executor of software instructions, the instructions may specifically configure the processor 206 to perform one or more operations described herein. The use of the terms "processor" and "processing circuitry" may be understood to include a single core processor, a multi-core processor, multiple processors internal to the apparatus 200, or one or more remote or "cloud" processor(s) external to the apparatus 200.

In some example embodiments, the memory 204 may include one or more non-transitory memory devices such as, for example, volatile or non-volatile memory that may be either fixed or removable. In this regard, the memory 204 may comprise a non-transitory computer-readable storage medium. It will be appreciated that while the memory 204 is illustrated as a single memory, the memory 204 may comprise a plurality of memories. The memory 204 may be configured to store information, data, applications, instructions or the like for enabling the apparatus 200 to carry out various functions in accordance with one or more example embodiments. For example, the memory 204 may be configured to buffer input data for processing by the processor 206. Additionally or alternatively, the memory 204 may be configured to store instructions for execution by the processor 206. The memory 204 may include one or more databases that may store a variety of files, contents, or data sets. Among the contents of the memory 204, applications may be stored for execution by the processor 206 in order to carry out the functionality associated with each respective application. In some cases, the memory 204 may be in communication with one or more of the processors 206, input/output circuitry 208 or communications circuitry 210, via a bus(es) for passing information among elements of the apparatus 200.

The input/output circuitry 208 may provide output to the user or an intermediary device and, in some embodiments, may receive one or more indication(s) of user input directly or indirectly. In some embodiments, the input/output circuitry 208 is in communication with processor 206 to provide such functionality. The input/output circuitry 208 may include one or more user interface(s) or include a display that may comprise the user interface(s) rendered as a web user interface, an application interface, or the like, to the display of a client device, a backend system, or the like. The input/output circuitry 208 may be in communication with the processing circuitry 202 to receive an indication of a user input at the user interface or to provide an audible, visual, mechanical, or other output to the user. As such, the input/output circuitry 208 may include, for example, a keyboard, a mouse, a joystick, a display, a touch screen display, a microphone, a speaker, or other input/output mechanisms. As such, the input/output circuitry 208 may, in some example embodiments, provide means for a user to access and interact with the apparatus 200. The processor 206 or input/output circuitry 208 comprising or otherwise interacting with the processor 206 may be configured to control one or more functions of one or more user interface elements through computer program instructions (e.g., software or firmware) stored on a memory accessible to the processor 206 (e.g., stored on memory 204, or the like).

The communications circuitry 210 may include one or more interface mechanisms for enabling communication with other devices or networks. In some cases, the communications circuitry 210 may comprise any means such as a device or circuitry embodied in either hardware, or a combination of hardware and software that is configured to receive or transmit data from/to a network or any other device or module in communication with the processing circuitry 202. The communications circuitry 210 may, for example, include an antenna (or multiple antennas) and supporting hardware or software for enabling communications with a wireless communication network (e.g., a wireless local area network, cellular network, global positioning system network, or the like) or a communication modem or other hardware/software for supporting communication via cable, digital subscriber line (DSL), universal serial bus (USB), Ethernet or other methods. The communications circuitry 210 may include the server connection engine 212 configured to enable the functionalities of the server connection 122. For example, communications circuitry 210 may be any means such as a device or circuitry embodied in either hardware, or a combination of hardware and software that is configured to receive or transmit data from/to a user component (e.g., user component 104) or agent component (e.g., agent component 108) or any other device or module in communication with the processing circuitry 202. For example, the server connection engine 212 may comprise software or a combination of hardware and software configured to establish and manage connections (e.g., the first secure connection 102a or the second secure connection 106a) with components (e.g., user component 104 or agent component 108) or any other device or module in communication with the processing circuitry 202.

In some embodiments, the apparatus 200 may include a masking engine circuitry 214 which may include hardware elements, with or without enabling software elements, firmware elements, or a combination thereof configured to, with the processing circuitry 202, input/output circuitry 208 or communications circuitry 210, perform one or more functions associated with the masking engine 126 (as described above with reference to FIG. 1). For example, the masking engine circuitry 214 may access, facilitate access, receive, process, manipulate, provide, or otherwise use, or make available for use, certain data (e.g., images, extracted text, predicted classifications, masked images, training data, or other data) used by one or more other elements of the apparatus 200 through, for example, the use of hardware, software, applications, or APIs executed using a processor, such as the processor 206. In some embodiments, the masking engine circuitry 214 may interact with the memory 204, which may store the aforementioned data. It should also be appreciated that, in some embodiments, the masking engine circuitry 214 may include a separate processor, specially configured field programmable gate array (FPGA), or application specific interface circuit (ASIC) to receive such data utilized by the masking engine circuitry 214. The masking engine circuitry 214 may also provide for communication with other elements of the apparatus 200, system or external systems via a network interface provided by the communications circuitry 210. In some embodiments, one or more portions of the masking engine circuitry 214 and processing circuitry 202 may be integrated into a single circuitry or group of circuitries, with or without various other circuitries discussed herein, configured to execute the respective functionalities thereof.

The masking engine circuitry 214 may include the neural network engine 216. The neural network engine 216 includes software or a combination of hardware and software that supports various functionality associated with one or more of the OCR model 126a or classification model 126b. For example, in some embodiments, the neural network engine 216 includes hardware, software, firmware, or a combination thereof, that analyzes at least one image to identify and extract text by utilizing the OCR model 126a. In some embodiments, the neural network engine 216 additionally or alternatively includes hardware, software, firmware, or a combination thereof, that applies the classification model 126b to the extracted text generated by the OCR model 126a to predict classifications indicative of whether the extracted text includes sensitive text. In some embodiments, the OCR model 126a is trained based on an image dataset associated with identifying text within the images via the neural network engine 216. In some embodiments, the classification model 126b is trained based on a textual dataset associated with classifying text within as sensitive text or non-sensitive text via the neural network engine 216.

The masking engine circuitry 214 includes the image processing engine 218. The image processing engine 218 includes software or a combination of hardware and software, that supports various functionality associated with the image processing model 126c of the masking engine 126. For example, in some embodiments, the image processing engine 218 includes hardware, software, firmware, or a combination thereof, that analyzes at least one image or data associated therewith (e.g., metadata, location data, pixel data, etc.) to mask sensitive text within the image by utilizing the image processing model 126c.

In this regard, FIG. 1 shows an example system environment 100 within which at least some embodiments of the present disclosure, including apparatus(es) 200, may operate. The depictions of the example system environment 100 and apparatus 200 are not intended to limit or otherwise confine the embodiments described and contemplated herein to any particular configuration of elements or systems, nor are they intended to exclude any alternative configurations or systems for the set of configurations and systems that can be used in connection with embodiments of the present disclosure. Rather, FIGS. 1-2 and the system environment 100 and apparatus(es) 200 disclosed therein are merely presented to provide an example basis and context for the facilitation of some of the features, aspects, and uses of the methods, apparatuses, computer readable media, and computer program products disclosed and contemplated herein. As noted above, in some embodiments, the secure server 120 may be embodied by one or more apparatuses 200 shown in FIG. 2 or portions thereof relevant to the functions of the respective devices.

Example Data Flows and Data Structures of the Disclosure

Figure 3:
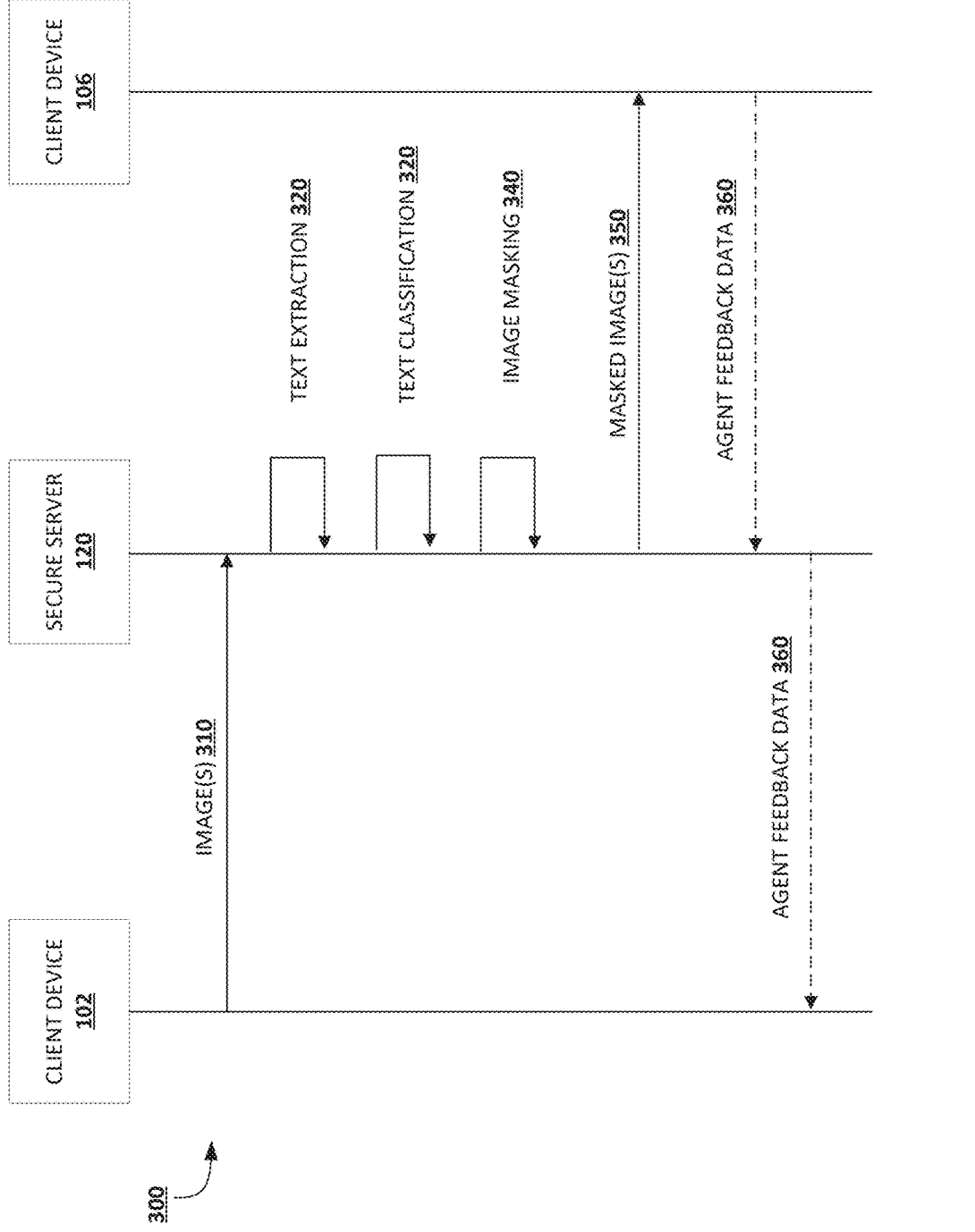
FIG. 3 illustrates an example data flow diagram showing example data structures in accordance with at least some embodiments of the present disclosure.

FIG. 3 is an example data flow 300 presented in accordance with one or more embodiments of the present disclosure. In some example embodiments, the data structures and processes shown and described with reference to the data flow diagram of FIG. 3 may be generated, performed, or otherwise facilitated by the various systems and apparatuses shown and described with reference to FIGS. 1-2.

As shown, the data flow 300 includes the client device 102, secure server 120, and client device 106. As described with reference to FIG. 1, the first secure connection 102*a* may be established (e.g., via the user component 104 and server connection 122) between the client device 102 and the secure server 120 for transmitting and receiving data, including, but not limited to, the image 310. Additionally, as described with reference to FIG. 1, the second secure connection 106*a* may be established (e.g., via the agent component 108 and server connection 122) between the client device 106 and the secure server 120 for transmitting and receiving data, including, but not limited to, the masked image 350 and agent feedback data 360.

In some embodiments, the connections (e.g., the secure connection between the client device 102 and the secure server 120 and the secure connection between the client device 106 and the secure server 120) may be established to facilitate live image sharing, such as a live screen sharing session between the client device 102 and the client device 106. For example, an operator of the client device 102 may wish to engage in a live screen sharing session with the operator of the client device 106. Accordingly, the operator of client device 102 may initiate a request for live screen sharing (e.g., using a feature of a software application associated with an enterprise system associated with the client device 102, secure server 120, and client device 106) which may in turn cause the connections to be established.

In various embodiments, either the operator of the client device 102 or the operator of the client device 106 may initiate a request for live image sharing. In some examples, the operator that does not initiate a request for live image sharing may be required to authorize the live image sharing (e.g., via an authorizing action input via a respective client device in response to a prompt, such as a pop up, displayed on the respective client device). In some embodiments, at least the user client device 102 may require preapproval from the operator (e.g., via the operator sending a request for live image sharing, selecting a preference to allow live image sharing (opting in), or selectively approving a prompt such as a pop up to authorize live image sharing in response to a request from the server or agent component). For example, in some embodiments, an initial electronic connection may be made between a user component and an agent component (e.g., via a secure server) prior to initiating a live image sharing session. Such initial connection may include a chat support session, an authentication function, or other electronic connection. In some embodiments, a live image sharing request may be transmitted via a software application associated with an enterprise system that includes that at least one secure server or the agent component (e.g., within a banking application facilitated by the same bank that operates the customer service function of the agent component), such that there may be a pre-existing connection between the enterprise system and the user component via the software application. In some embodiments, a secure server or agent component may trigger the request for live image sharing during a support call with the user (e.g., an at least audio call facilitated by the secure server or separately, such as via telephone call). The request in such embodiments may then prompt the user to accept the live image sharing session and begin sharing in some embodiments. In certain embodiments, the connections between the client devices 102 and 106 and the secure server 120 may be established responsive to such a request for live image sharing. Alternatively, in some embodiments, the connections may be established prior to live image sharing (e.g., responsive to a prior request at the beginning of a live service call that does not yet include live image sharing) and live image sharing may begin responsive to a second request or authorizing event.

In various embodiments, a request for live image sharing may be initiated at one or more different pages, windows, menus, or the like within a software application, for example, using an overlay configured to be accessible any-where within a software application, using a dedicated button, or the like. For example, live image sharing may be initiated at a login menu, a main screen after login, a help menu, a dedicated live image sharing tab, or the like.

In any case, once the connections are established, in some embodiments, the client device 102 may transmit the image 310 to the secure server 120. As described with reference to FIG. 1, the user component 104 associated with the client device 102 may be configured to capture and transmit the image 310 representative of a graphical user interface or portion thereof displayed at the client device 102. In some embodiments, the graphical user interface may include sensitive text (e.g., any text that should not be exposed to the operator of the client device 106). Accordingly, the secure server 120 may perform one or more operations 320-340 to generate the masked image 350 (e.g., by masking the sensitive text to render the sensitive text obscured or other-wise illegible).

As described with reference to FIG. 1, in various embodi-ments, the operations 320-340 may be performed by the secure server 120 by applying the masking engine 126 to the image 310. For example, at operation 320, the masking engine 126 may use the OCR model 126*a* to perform text extraction. In an example, the OCR model 126*a* may ana-lyze the image 310 to identify any text within the image 310 and generate extracted text based thereon. For example, the OCR model 126*a* may convert the images of text (e.g., electronically printed text) from the image to machine-encoded text. The extracted text may be, for example, standard machine-readable text that may then be provided to another model configured to receive textual inputs, for example, the classification model 126*b*. Additionally, in some examples, the OCR model 126*a* may generate location data representative of where the extracted text is located within the image (e.g., (x,y) coordinate data. Such location data may be provided directly to other models (e.g., the image processing model 126*c*), associated with the extracted text or the image, for example, as metadata, or the like.

In various embodiments, the extracted text may be pro-vided to the classification model 126*b*. In some embodi-ments, the extracted text may be provided to the classifica-tion model 126*b* using different techniques, for example, to achieve desirable performance based on a particular use case. For example, extracted text from the OCR model 126*a* may be parsed into separate inputs (e.g., tokens or chunks of discrete strings) according to different techniques or logic prior to being input to the classification model 126*b*. Alter-natively, as another example, all of the extracted text may be provided to the classification model 126*b* as a single input. In some embodiments, the OCR model 126*a* (or a sub model thereof) or the classification model 126*b* (or a sub model thereof) may be configured to parse the extracted text. In some embodiments, a clustering technique (e.g., K-means) may be applied to extract text based on proximity within the image 310 to determine which text belongs together as an input. For example, the OCR model or a related software element associated with the masking engine may identify a location associated with each extracted portion of text or any increments thereof, and the locations may be compared as described above to group the text into strings for analysis. In some embodiments, the extracted text may be grouped into words or phrases for analysis. In some embodiments, the extracted text may be grouped by physical continuity in the image (e.g., sections of text forming part of a word, phrase, line, or the like of continuous text may be analyzed together). In some embodiments, the extracted text may be analyzed in a plurality of different string groupings (e.g., a phrase may be analyzed by the classification model and each word of the phrase, or numbers and other characters incorporated into the phrase, may be analyzed separately and in any number of sub-groups), whereby the masking is applied to the particular grouping (or sub-grouping) classified as sensitive. In some embodiments, extracted text may be clustered using a hierarchical technique (e.g., individual words or terms, sentences, paragraphs) based on a layout analysis (e.g., analyzing spatial arrangements of text, headings, delimiters, etc.), natural language processing (e.g., semantic analysis to determine context of text segments), or the like.

In some embodiments, a sequential processing technique may be applied where the OCR model 126a and the classification model 126b are executed sequentially. For example, the OCR model 126a may extract text (and corresponding location data) from a received image and the extracted text may then be provided to the classification model 126b for classification as sensitive text or non-sensitive text. In some embodiments, a data transfer object (DTO) may be used. For example, the output of the OCR model (i.e., extracted text) may be encapsulated in a DTO that is provided to the classification model 126b. In some embodiments, a DTO may be beneficial for structuring or otherwise organizing extracted text or other data, for example, making it easier to transmit or provide to the classification model 126b. In some embodiments, the functionalities of the OCR model 126a and the classification model 126b may be wrapped (e.g., as functions or classes) and exposed via an API. In some embodiments, wrapping models and exposing them via an API may provide increased accessibility, flexibility, and modularity.

Regardless of the particular input technique applied, at operation 330, the masking engine 126 may use the classification model 126b to classify the extracted text generated by the OCR model 126a. For example, the extracted text may be input to the classification model 126b configured to analyze the extracted text and generate predicted classifications indicative of whether the input extracted text is sensitive text or non-sensitive text.

At operation 340, the masking engine 126 may use the image processing model 126c to mask the image 310 based on the predicted classifications. For example, the image processing model 126c may be configured to mask the image 310 by masking the locations within the image 310 corresponding to the extracted text identified as sensitive text (e.g., using (x,y) coordinate data generated by the OCR model 126a), thereby generating the masked image 350.

As described with reference to FIG. 1, the secure server 120 may transmit the masked image 350 (e.g., via the server connection 122 and the second secure connection 106a) to the client device 106. Accordingly, the client device 106 may receive the masked image 350 (e.g., via the agent component 108) and display the masked image 350 on a screen of the client device 106 (e.g., via the image component 108b).

In some embodiments, the client device 106 may be configured to transmit agent feedback data 360 to the secure server 120 for relay to the client device 102. For example, the agent feedback data 360 may include data representative of inputs detected at the client device 106 (e.g., via the agent component 108) such as audio data, image data, textual data, cursor data, or the like, such that the agent feedback data 360 may facilitate the operator of the client device 106 providing feedback and direction to the operator of the client device 102.

Figure 4:
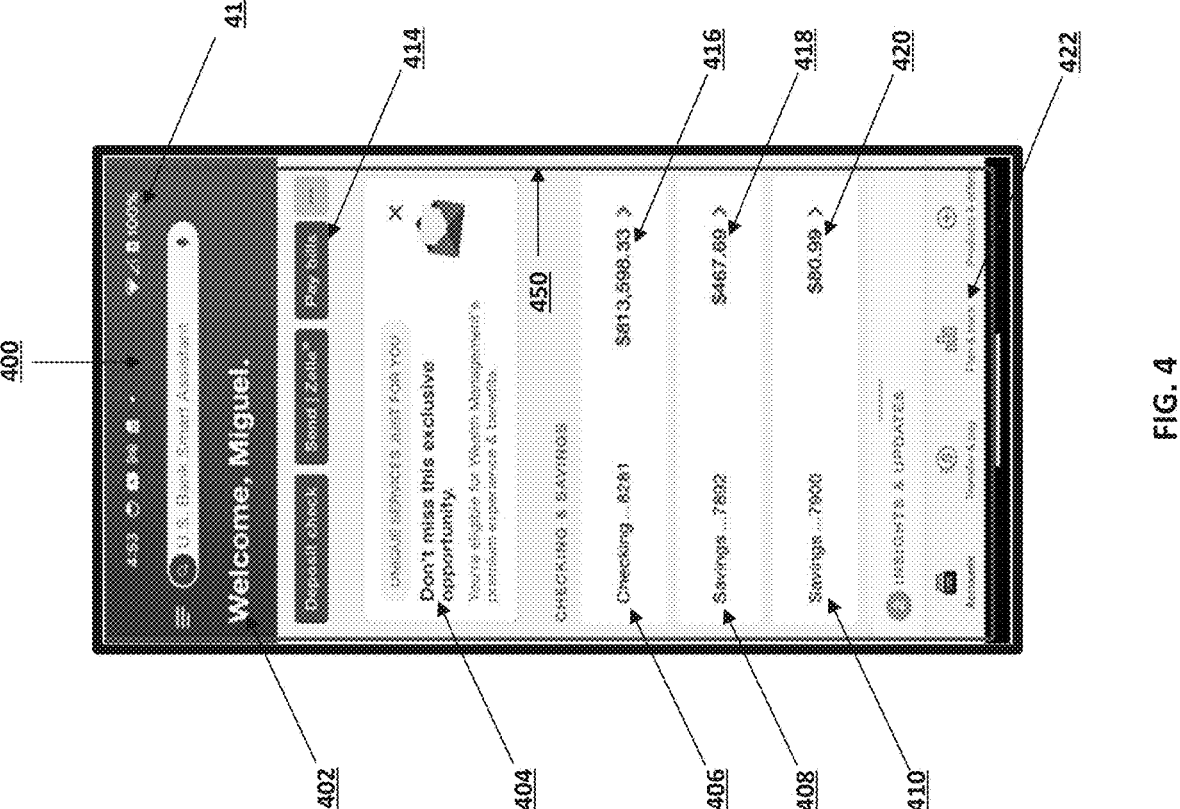
FIG. 4 illustrates an example embodiment of a client device displaying a graphical user interface in accordance with at least some embodiments of the present disclosure.

FIG. 4 is an example embodiment of a graphical user interface 400 of a client device 102. The graphical user interface 400 may be, for example, a graphical user interface of a mobile application associated with an enterprise, such as a bank, and accessed via the client device 102 operated by a customer of the bank. In various examples, the graphical user interface 400 may be generated by a software application whose primary functionality is different than the live sharing and masking functionality, and the live sharing and masking functionality described herein may be a sub-function built into the software application or may be a process run by another application (e.g., a second dedicated software application running, a web browser extension, or any of the various other embodiments described herein in parallel with the primary application, such as in the background of the mobile device).

Continuing the above example, the customer may need to engage in live image sharing with an operator of another client device (e.g., client device 106), for example, a live screen sharing session with an agent of the bank tasked with providing support to the customer. As described with reference to FIGS. 1 and 3, the customer may use the client device 102 to initiate a live screen sharing session in which the secure server 120 acts as an intermediary between the client devices of the customer and the agent.

During the live screen sharing session, an image representative of the graphical user interface 400, such as a screenshot, may be captured and transmitted to the secure server, for example, by the user component 104 associated with the client device 102.

In some embodiments, the image may be captured (e.g., via the user component 104) based at least in part on a detected change associated with the graphical user interface 400. For example, if the customer were to select an interactive button, such as the "Plan & track" button associated with text 422, the graphical user interface 400 may change to present a new graphical user interface associated with the "Plan & track" button. In such an example, the user component 104 may be configured to detect the change in the graphical user interface 400 and capture an image of the new graphical user interface. Capturing images in response to a trigger, such as the interface changing or an interactive element on the interface being selected, may reduce the bandwidth of the transmission necessary to maintain the sharing session without reducing the information available to the receiving client device and while maintaining the appearance of being a continuous video on the receiving client device side. In some embodiments, the user component 104 may detect the change in the graphical user interface 400 by, for example, monitoring the screen (e.g., capturing screenshots continuously and applying image analysis to detect a difference exceeding a threshold value, monitoring pixel display values for changes via the backend of the mobile application, etc.). Additionally or alternatively, the user component 104 may detect the change in the graphical user interface 400 by, for example, using a custom hook or general event listener associated with the mobile application (e.g., a listener for specific or general events including, for example, the activation of the "Plan & track" button or any other button).

In some embodiments, the image may be captured (e.g., via the user component 104) based at least in part on a bandwidth measure detected at the client device 102. For example, if the client device 102 were to detect a decrease in available bandwidth (e.g., as more bandwidth is used by the client device 102 for the live screen sharing session or any other ongoing transmitting or receiving, as a connectivity signal decrease in available bandwidth, etc.), the user component 104 may be configured to decrease the rate with which images are captured and transmitted to the secure server 120. Alternatively, in some examples, if the client device 102 were to detect an increase in available bandwidth, the user component 104 may be configured to increase the rate with which images are captured and transmitted to the secure server 120.

In some embodiments, the image may be captured (e.g., via the user component 104) based at least in part on a time interval. For example, an image may be captured every one hundred milliseconds, every ten milliseconds, every one second, every other second, at least once every 2 seconds, no more than five times a second, or the like.

Continuing the above example, once the live screen sharing session is active (e.g., once the first secure connection 102*a* and the second secure connection 106*a* are established), the user component 104 of some embodiments may be configured to provide indication of the ongoing live screen sharing session. For example, the border 450 may be a colored border that is overlaid on the graphical user interface 400 to indicate the live screen sharing session is ongoing. In various embodiments, other indicators (e.g., a notification, a screen effect, an icon, an audible notification, a vibration, etc.) may be used to indicate to the operator of the client device 102 that the live screen sharing session is ongoing. Additionally, as mentioned with reference to FIGS. 1 and 3, the live screen sharing session may have to be authorized by one or more operators of the client devices associated with the screen sharing session.

As shown, the graphical user interface 400 includes a plurality of different locations with text, for example, the text 402-422. It should be appreciated that, for simplicity, the labeled text 402-422 includes some, but not all of the text in the graphical user interface 400 and that example embodiments described herein may be configured to identify, extract, and classify all text within an image representative of the graphical user interface 400.

Returning to the previous example, certain text that may be captured during the live screen sharing session may be considered irrelevant, confidential, or the like, such that it should not be exposed to the agent during the live screen sharing session. For example, the texts identified with reference numerals 416-420 include bank account balances which may be confidential and therefore not to be exposed to the agent (e.g., sensitive text). In contrast, the texts identified with reference numerals 402-414 and 422 do not include information that is irrelevant, confidential, or the like. As such, the text 402-414 and 422 may be relevant to and help facilitate an effective live screen sharing session (e.g., by enabling the agent to understand the graphical user interface 400 the customer is viewing). In some embodiments, a user preference or other preference or setting may be selected to define a degree to which the graphical user interface is masked during live support sessions. For example, as a baseline, confidential information (e.g., account balances 416-420 or account numbers) may be masked but other text may be unmasked. At a second preference level, irrelevant text may also be defined as sensitive and screened (e.g., promotions related text 404). At a third preference level, all text or all text not explicitly opted-in for sharing by the user may be defined as sensitive and masked. In some embodiments, region based masking may be applied in addition to text based masking. For example, a notification bar or other region of the graphical user interface may be excluded from the image or flagged for masking within the captured image in addition to the text based analysis described herein. In some embodiments, a portion of the graphical user interface may be selected for sharing (e.g., by drawing a border 450 around the area to be shared) and the image may be created with or modified to show only the selected portion of the graphical user interface or the portions of the graphical user interface outside the selected portion may be flagged for masking.

Accordingly, an image (e.g., a screenshot) representative of the graphical user interface 400 may require masking to mask the sensitive text 416-420 while maintaining visibility or legibility of the non-sensitive text 402-414 and 422. Additionally, the masking applied should be minimal to effectively mask the sensitive text 416-420 while maintaining visibility of non-sensitive text and other regions of the image, such that the agent may make sense of the graphical user interface 400. For example, if the masking technique applied were to obscure too much of the image in response to masking the sensitive text 416-420, the image may become too convoluted for the agent to make sense of the graphical user interface 400 or assist the customer.

Figure 5:
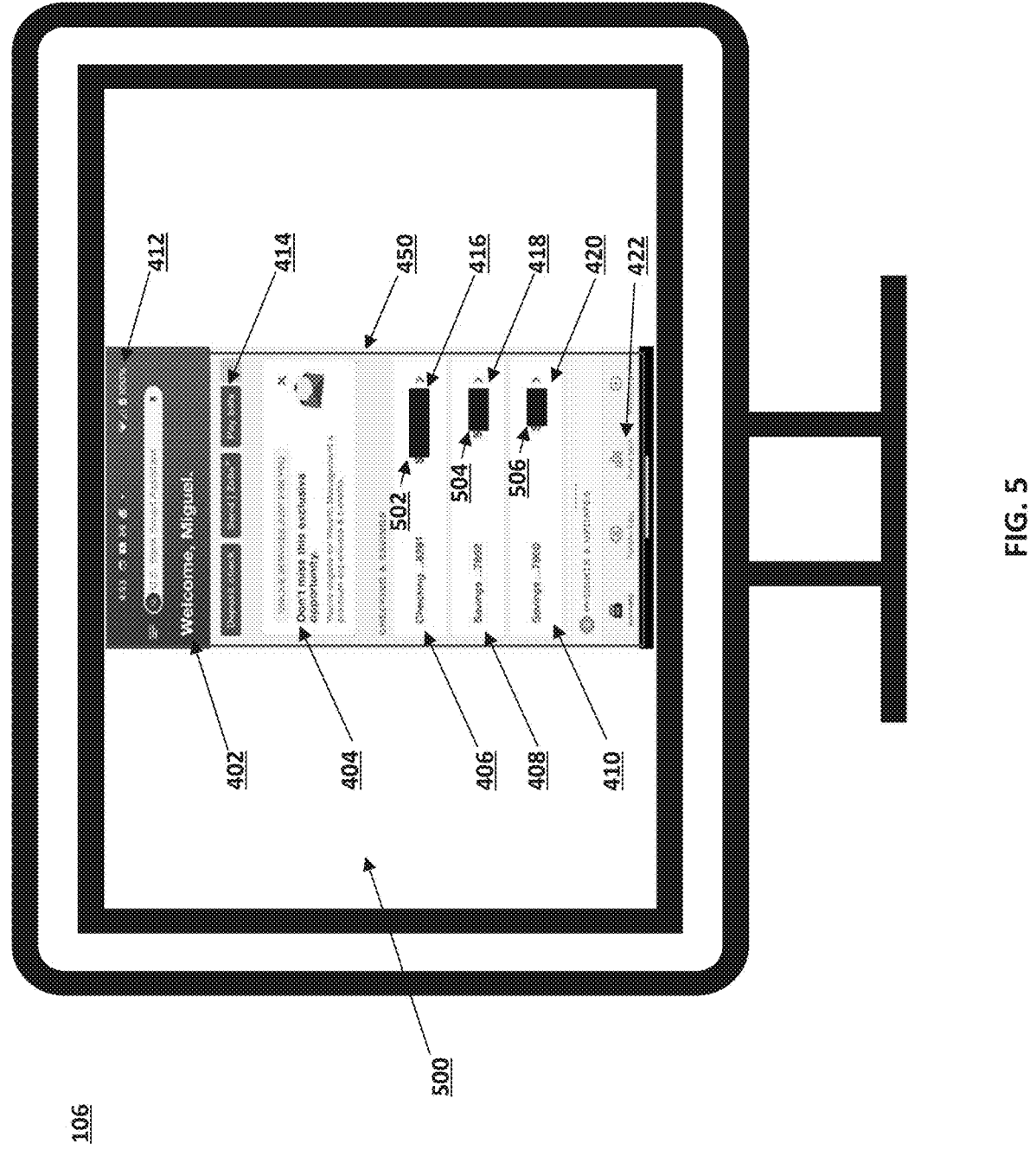
FIG. 5 illustrates an example embodiment of a client device displaying a masked image in accordance with at least some embodiments of the present disclosure.

Using various techniques described herein, example embodiments may be configured to, via the secure server 120 applying the masking engine 126, identify and extract all text within the image, classify the extracted text as sensitive text or non-sensitive text, and mask the sensitive text to generate a masked image to be transmitted to and displayed by the client device of the agent. FIG. 5 is an example embodiment of client device 106 displaying the masked image 500 generated from the image representative of the graphical user interface 400.

Continuing the non-limiting example from FIG. 4, the client device 106 may be, for example, an enterprise terminal associated with the bank and operated by the agent. The client device 106 may be any other device according to the various embodiments discussed herein. As described with reference to FIGS. 1 and 3, the client device 106 may receive the masked image 500 from the client device 102 (e.g., relayed and masked by the secure server 120 from the user component 104 to the agent component 108). As shown, the sensitive text 416-420 has been masked in the masked image 500 by including the opaque rectangles 502-502 which obscure the sensitive text 416-420. In other example embodiments, any alternative masking techniques may be used in accordance with any of the embodiments discussed herein. For example, instead of the opaque rectangles 502-506, the masking engine 126 (e.g., via the image processing model 126*c*) may blur the sensitive text 416-420, change pixel values of the masked image 500 associated with the regions of the sensitive text 416-420, or use any other masking technique applicable to render the sensitive text 416-420 less readable or unreadable.

As shown, the masked regions (e.g., opaque rectangles 502-506) are configured around the sensitive text 416-420 to effectively mask the sensitive text 416-420 while minimizing the area of the masked regions (e.g., to maintain the useability of the masked image 500 to still provide enough information to the agent to provide support). In some embodiments, the masking process at least masks the pixels associated with the extracted sensitive text when rendered on the client device screen.

In various embodiments, the live image sharing described herein may include a plurality of images to be masked and transmitted for display. For example, in some embodiments, the client device 106 may be configured to display a plurality of masked images received from the secure server 120 simultaneously (e.g., as part of a mosaic) or sequentially. In some embodiments, the plurality of masked images may be displayed as video playback. For example, the masked image 500 may be a single image in a stream of continuously or periodically captured images during the live screen sharing session that are displayed (e.g., masked image 500 may be a single frame in a video of masked or unmasked images).

Example Methods

FIG. 6 illustrates an example flowchart depicting an example set of operations for generating a masked image in accordance with at least some example embodiments of the present disclosure. In some embodiments, the process according to FIG. 6 may be performed at least in part by one or more secure servers. While FIG. 6 depicts a process for masking a single image, the process may be repeated for any number or sequence of images, including screen sharing videos. In some embodiments, the process 600 or any sub-portion thereof, may occur autonomously following an initial trigger to begin the live sharing session.

As depicted at operation 602, the process 600 begins to establish a first secure connection with a user component. In some embodiments, the user component may be associated with a client device. In some embodiments, the first secure connection may be established between a user component (e.g., via a client connection component) and the secure server (e.g., via the server secure connection).

At operation 604, the process continues to establish a second secure connection with an agent component. In some embodiments, the agent component may be associated with a client device. In some embodiments, the second secure connection may be established between an agent component (e.g., via a client connection component) and the secure server (e.g., via the server connection). Operations 602 and 604 may occur simultaneously or in any order, and the respective secure connections may be established via prompt from the server (e.g., outbound message from the at least one server to the respective component(s)) or receiving a prompt from the respective component(s). In some embodiments, a communication from one component to the server may establish the respective secure connection associated with that component while also triggering the server to establish the other secure connection (e.g., operation 602 may occur in response to operation 604 and vice versa). In some embodiments, only operation 602 is required for the initial masking process and operation 604 may occur at any point prior to or concurrent with transmitting the masked image to the agent component.

At operation 606, the process continues to receive an image representative of at least a portion of a graphical user interface. In some embodiments, the image is received from the user component and via the first secure connection. In some embodiments, the portion of the graphical user interface may comprise sensitive text.

In some embodiments, prior to masking, the image may be applied to a second classification model configured to classify the image or a portion thereof. The second classification model may use computer vision (e.g., via a convolutional neural network) to classify the image itself or a portion thereof. For example, each image or a subset of the received images may be first classified to identify a graphical user interface type. The graphical user interface type may serve as a pre-screening for the masking engine to sort the types of interfaces requiring masking from the types that do not. For example, certain pages of a software application (e.g., privacy policies, menus, or other interface elements lacking sensitive text) may be classified for identification and, based on the lack of any possible sensitive text thereon, may be pre-screened for transmission directly to the agent component (or may be withheld as irrelevant to the agent component) rather than being masked. This pre-screening may further reduce the load on the computing processes of the secure server and expedite and facilitate the live screen sharing.

At operation 608, the process continues to apply the image to a masking engine. In some embodiments, the masking engine may be configured to generate a masked image by masking at least the sensitive text. In some embodiments, the masking engine may include an OCR model, classification model, or image processing model configured to perform one or more functionalities of the masking engine. For example, at operation 610, the process continues by extracting text from the image as extracted text using an OCR model. If no text is detected by the OCR model, the process may terminate and the unmasked image may be sent to the agent component or an error condition may be triggered. At operation 612, the process continues by classifying at least a portion of the extracted text as sensitive text using a classification model. If no sensitive text is detected, the process may terminate and the unmasked image may be sent to the agent component or an error condition may be triggered. At operation 614, the process continues by masking the sensitive text using an image processing model.

At operation 616, the process continues to transmit the masked image. In some embodiments, the masked image is transmitted to the agent component and via the second secure connection. In some embodiments, the first secure connection or the second secure connection comprise a two-way connection channel.

FIG. 7 illustrates an example flowchart depicting an example set of operations for generating a masked image in accordance with at least some example embodiments of the present disclosure. In some embodiments, the process illustrated in FIG. 7 may be performed at least partly by the user component operating in association with a user client device (e.g., client device 102 illustrated in FIG. 1).

As depicted at operation 702, the process 700 may include operating a software application on a first client device. The software application may be configured to perform any functions and may be associated with any third party systems (e.g., a banking application associated with a bank).

As depicted at operation 704, the process continues by initiating a live screen sharing session. The session may be triggered via the various initiation processes discussed herein. The live screen sharing session may include operations 706-710 discussed below. In some embodiments, a customer support session or other live communication session may be initiated or already in progress at initiation of the live screen sharing session. The live screen sharing session may only involve screen sharing in some embodiments or may include other signals, such as audio communication between the user component and agent component. In some embodiments, operation 704 and the subsequent operations 706-710, or any sub-portion thereof, may occur autonomously following an initial trigger to begin the live sharing session.

As depicted at operation 706, the process continues by capturing an image representative of at least a portion of the graphical user interface of the software application. In some embodiments, the screen capture may be taken via a sub-function within the software application itself (e.g., built into the banking app) or via a second software application running in association with the first client device. In the latter example, the second software application may run in the background and be operated via one or more of the initiation signals discussed herein.

As depicted at operation 708, the process continues by encrypting the image, which may define an encrypted image. Because the image may have sensitive text, the image is encrypted for transmission to the secure server to avoid disclosure of or access to the sensitive text between the user component and the secure server. The masked image, discussed herein, may be transmitted as an encrypted or unencrypted image.

As depicted at operation 710, the process continues by transmitting the encrypted image to a secure server for masking and delivery to the agent component of the masked image.

Example Machine Learning Framework

Figure 8:
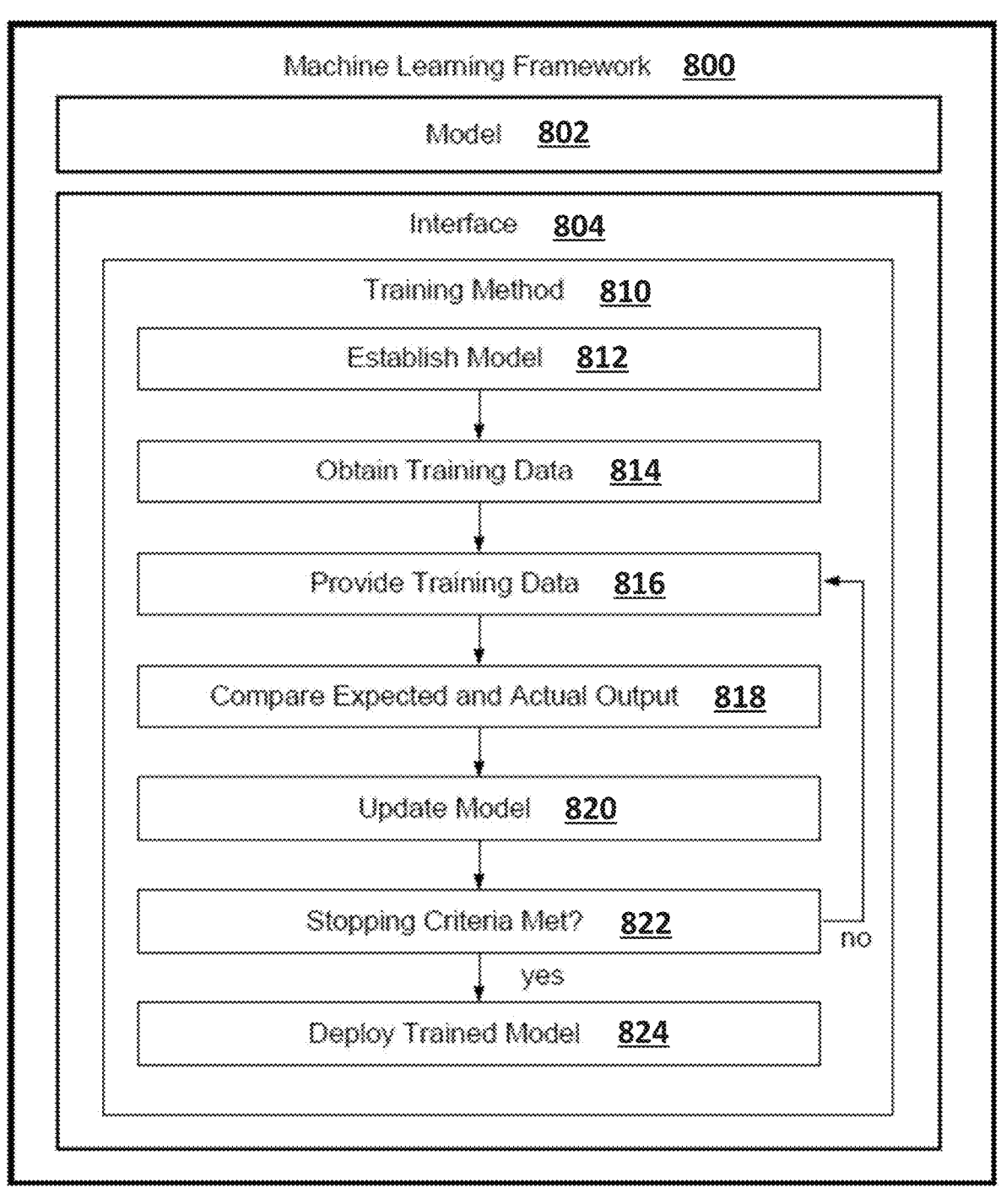
FIG. 8 illustrates an example machine learning framework for use with embodiments of the present disclosure.

FIG. 8 illustrates an example machine learning framework 800 that techniques described herein may benefit from or improve on. In some embodiments, the machine learning framework may be used to train and deploy the models described herein, including but not limited to the OCR model, the classification model, or the image processing model. A machine learning framework 800 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 800 or elements thereof are often built or refined from existing frameworks, such as TENSORFLOW by GOOGLE, INC. or PYTORCH by the PYTORCH community.

The machine learning framework 800 can include one or more models 802 that are the structured representation of learning and an interface 804 that supports use of the model 802.

The model 802 can take any of a variety of forms. In many examples, the model 802 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 802 can include a representation of memory (e.g., providing long short-term memory functionality). Where the set includes more than one model 802, the models 802 can be linked, cooperate, or compete to provide output.

The interface 804 can include software procedures (e.g., defined in a library) that facilitate the use of the model 802, such as by providing a way to establish and interact with the model 802. For instance, the software procedures can include software for receiving input, preparing input for use (e.g., by performing vector embedding, such as using Word2Vec, BERT, or another technique), processing the input with the model 802, providing output, training the model 802, performing inference with the model 802, fine tuning the model 802, other procedures, or combinations thereof.

In an example implementation, interface 804 can be used to facilitate a training method 810 that can include operation 812. Operation 812 includes establishing a model 802, such as initializing a model 802. The establishing can include setting up the model 802 for further use (e.g., by training or fine tuning). The model 802 can be initialized with values. In examples, the model 802 can be pretrained. Operation 814 can follow operation 812. Operation 814 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 802. Operation 816 can follow operation 814. Operation 816 includes providing a portion of the training data to the model 802. This can include providing the training data in a format usable by the model 802. The machine learning framework 800 (e.g., via the interface 804) can cause the model 802 to produce an output based on the input. Operation 818 can follow operation 816. Operation 818 includes comparing the expected output with the actual output. In an example, this can include applying a loss function to determine the difference between expected and actual. This value can be used to determine how training is progressing. Operation 820 can follow operation 818. Operation 820 includes updating the model 802 based on the result of the comparison. This can take any of a variety of forms depending on the nature of the model 802. Where the model 802 includes weights, the weights can be modified to increase the likelihood that the model 802 will produce correct output given an input. Depending on the model 802, backpropagation or other techniques can be used to update the model 802. Operation 822 can follow operation 820. Operation 822 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 814. If the stopping criterion has been satisfied, the flow can move to operation 824. Operation 824 includes deploying the trained model 802 for use in production, such as providing the trained model 802 with real-world input data and produce output data used in a real-world process. The model 802 can be stored in memory of at least one computing device (e.g., the secure server 120 shown in FIG. 1, apparatus 200 shown in FIG. 2, or the computers 910 shown in FIG. 9), or distributed across memories of two or more such computing devices for production of output data (e.g., predictive data).

Example Computing Environment

Figure 9:
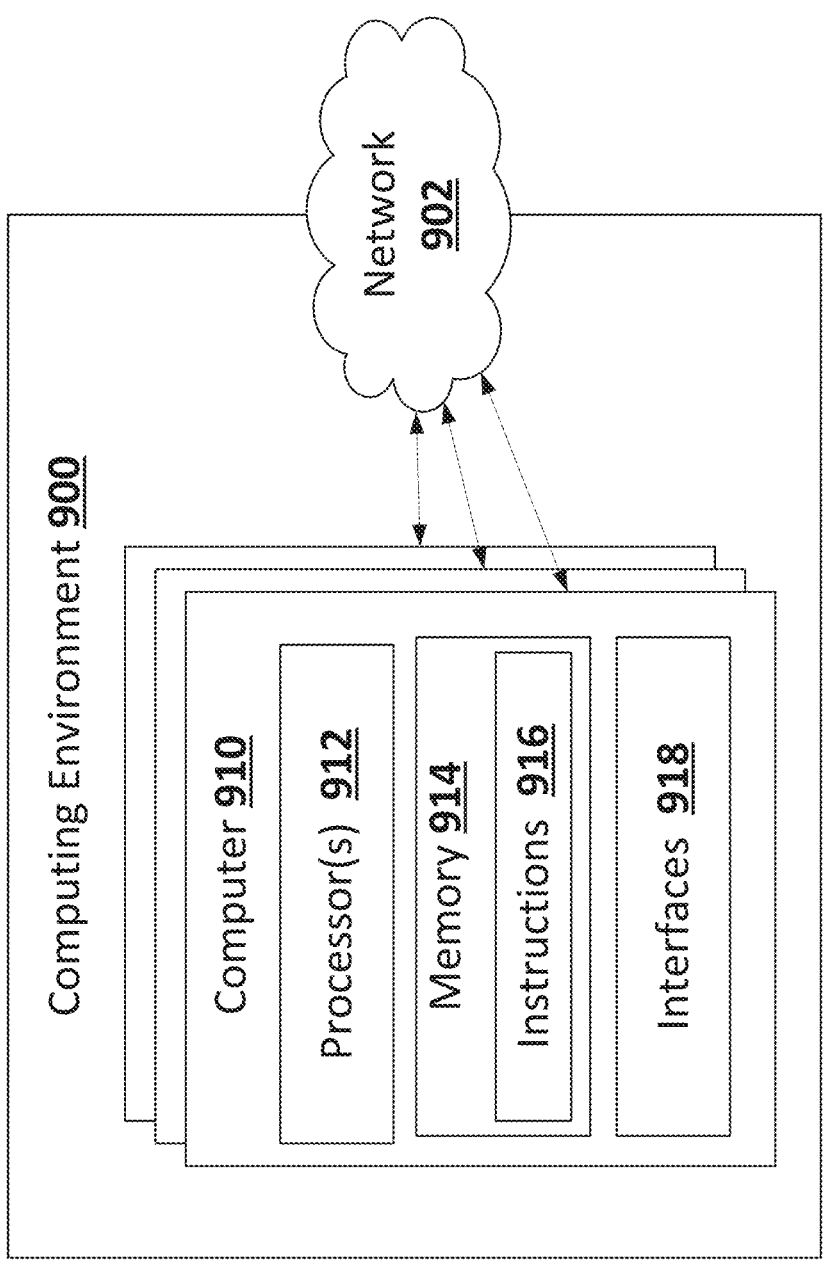
FIG. 9 illustrates an example computing environment for use with embodiments of the present disclosure.

FIG. 9 discloses a computing environment 900 in which aspects of the present disclosure may be implemented. A computing environment 900 is a set of one or more virtual or physical computers 910 that individually or in cooperation achieve tasks, such as implementing one or more aspects described herein. For example, the computers 910 may represent the client devices 102, 106 or the secure server 120 shown in FIG. 1 deployed in a computing environment 900 connected by at least one network 902). The computers 910 have elements that cooperate to cause output based on input. Example computers 910 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, the computing environment 900 includes at least one physical computer.

The computing environment 900 may specifically be used to implement one or more aspects described herein. In some examples, one or more of the computers 910 may be implemented as a user device, such as either or both of the client devices 102, 106 and others of the computers 910 may be used to implement aspects of a secure server (e.g., secure server 120 shown in FIG. 1 and the apparatus 200 shown in FIG. 2), which may include, in some embodiments, a machine learning framework useable to train and deploy models exposed to the mobile device or provide other functionality, such as through exposed application programming interfaces.

The computing environment 900 can be arranged in any of a variety of ways, including the layout illustrated in FIG. 1. The computers 910 can be local to or remote from other computers 910 of the computing environment 900. The computing environment 900 can include computers 910 arranged according to client-server models, peer-to-peer models, edge computing models, other models, or combinations thereof.

In many examples, the computers 910 are communicatively coupled with devices internal or external to the computing environment 900 via a network 902. The network 902 is a set of devices that facilitate communication from a sender to a destination, such as by implementing communication protocols. Example networks 902 include local area networks, wide area networks, intranets, or the Internet.

In some implementations, computers 910 can be general-purpose computing devices (e.g., consumer computing devices). In some instances, via hardware or software configuration, computers 910 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 910 include one or more processors 912, memory 914, and one or more interfaces 918. Such elements can be virtual, physical, or combinations thereof.

The one or more processors 912 are elements that execute instructions, such as instructions that obtain data, process the data, and provide output based on the processing. The one or more processors 912 often obtain instructions and data stored in the memory 914. The one or more processors 912 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 912 include at least one physical processor implemented as an electrical circuit. Example providers of processors 912 include INTEL, AMD, QUALCOMM, TEXAS INSTRUMENTS, and APPLE.

The memory 914 is a collection of elements configured to store instructions 916 and data for later retrieval and use. The instructions 916 can, when executed by the one or more processors 912, cause execution of one or more operations that implement aspects described herein. In many examples, the memory 914 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 914 can store information encoded in transient signals.

The one or more interfaces 918 are elements that facilitate receiving input from and providing output to something external to the computer 910, such as visual output elements (e.g., displays or lights), audio output elements (e.g., speakers), haptic output elements (e.g., vibratory elements), visual input elements (e.g., cameras), auditory input elements (e.g., microphones), haptic input elements (e.g., touch or vibration sensitive elements), motion input elements (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input elements, or combinations thereof (e.g., a touch sensitive display). The one or more interfaces 918 can include elements for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via elements configured to communicate via radiofrequency signals, such as according to WI-FI, cellular, BLUETOOTH, ZIGBEE, or other protocols). One or more of the one or more interfaces 918 can facilitate connection of the computing environment 900 to a network 902.

The computers 910 can include any of a variety of other elements to facilitate performance of operations described herein. Example elements include one or more power units (e.g., batteries, capacitors, power harvesters, or power supplies) that provide operational power, one or more busses to provide intra-device communication, one or more cases or housings to encase one or more elements, other elements, or combinations thereof.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system elements in the embodiments described above should not be understood as requiring such separation in all embodiments, and it should be understood that the described program elements and systems can generally be integrated together in a single software product or packaged into multiple software products.

Thus, embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system comprising:

a first client device comprising a user component, the user component configured to cause capture of images representative of at least a portion of a graphical user interface displayed at the first client device;

a second client device comprising an agent component; and at least one secure server comprising at least one processor, at least one communications circuitry, and at least one memory, the at least one memory comprising computer coded instructions therein, wherein the computer coded instructions are configured to, when executed by the at least one processor, cause the at least one secure server to:

establish, via the at least one communications circuitry, a first connection between the user component and the at least one secure server;

establish, via the at least one communications circuitry, a second connection between the agent component and the at least one secure server;

receive, from the first client device via the first connection, an image representative of at least a portion of the graphical user interface displayed at the first client device;

apply, via the at least one secure server, the image to a masking engine by:

extracting, via an optical character recognition (OCR) model, text of the graphical user interface from the image to generate extracted text;

classifying, via a text-based classification model applied to the extracted text, at least a portion of the extracted text as sensitive text based on contents of the extracted text; and masking, via an image processing model, the sensitive text to generate a masked image; and transmit, to the agent component via the second connection, at least one masked image comprising the masked image.

2. The system according to claim 1, wherein the user component comprises first computer coded instructions that, when executed by a first processor associated with the first client device, cause the first client device to:

capture the image while the portion of the graphical user interface is displayed on a screen of the first client device; and transmit the image to the at least one secure server via the first connection.

3. The system according to claim 2, wherein the first computer coded instructions, when executed by the first processor associated with the first client device, further cause the first client device to:

encrypt the image prior to transmitting the image as an encrypted image to the at least one secure server via the first connection, wherein the at least one masked image transmitted to the agent component via the second connection is unencrypted.

4. The system according to claim 1, wherein the agent component comprises second computer coded instructions configured to, when executed by a second processor associated with the second client device, cause the second client device to:

receive the at least one masked image; and display the at least one masked image on a screen associated with the second client device.

5. The system according to claim 4, wherein the computer coded instructions, when executed by the at least one processor, further cause the at least one secure server to:

receive a plurality of images, including the image, from the first client device via the first connection;

generate a plurality of masked images, including the at least one masked image, based on the plurality of images; and transmit the plurality of masked images, including the at least one masked image, to the second client device via the second connection;

wherein receiving the at least one masked image comprises receiving the plurality of masked images, including the at least one masked image, and wherein displaying the at least one masked image on the screen associated with the second client device comprises displaying the plurality of images sequentially as a video.

6. The system according to claim 1, wherein the image is captured in response to a detected change within the graphical user interface.

7. The system according to claim 1, wherein:

a software application is associated with (i) the user component, (ii) the agent component, and (iii) the graphical user interface; and the text-based classification model is trained based on training data associated with the software application.

8. The system according to claim 1, wherein the computer coded instructions, when executed by the at least one processor, further cause the at least one secure server to:

receive agent feedback from the agent component, the agent feedback being representative of one or more user inputs detected at the second client device and associated with the at least one masked image; and transmit the agent feedback to the user component.

9. A computer-implemented method comprising:

establishing, via one or more processors, a first connection with a user component, the user component configured to cause capture of images representative of at least a portion of a graphical user interface displayed at a client device;

establishing, via one or more processors, a second connection with an agent component;

receiving, from the user component via the first connection, an image representative of at least a portion of the graphical user interface, the portion of the graphical user interface comprising sensitive text;

applying the image to a masking engine by:

extracting, via an optical character recognition (OCR) model, text of the graphical user interface from the image to generate extracted text;

classifying, via a text-based classification model applied to the extracted text, at least a portion of the extracted text as sensitive text based on contents of the extracted text; and masking, via an image processing model, the sensitive text to generate a masked image; and transmitting, via one or more processors, to the agent component via the second connection, the masked image.

10. The computer-implemented method according to claim 9, wherein the computer-implemented method further comprises:

receiving, from the user component via the first connection, a second image;

determining, based on applying the second image to the text-based classification model of the masking engine, that the second image comprises no sensitive text; and transmitting the second image to the agent component.

11. The computer-implemented method according to claim 9, wherein the image is encrypted, and wherein the computer-implemented method further comprises decrypting the image prior to applying the image to the masking engine.

12. The computer-implemented method according to claim 11, wherein the masked image is unencrypted.

13. The computer-implemented method according to claim 9, wherein the first connection comprises a two-way connection channel configured to, in real time, transmit input data detected at a first client device associated with the user component from the first client device to a secure server and transmit input data detected at a second client device associated with the agent component from the secure server to the first client device.

14. The computer-implemented method according to claim 9, wherein the second connection comprises a two-way connection channel configured to, in real time, transmit input data detected at a second client device associated with the agent component from the second client device to a secure server and transmit input data detected at a first client device associated with the user component from the secure server to the second client device.

15. The computer-implemented method according to claim 9, further comprising receiving a live sharing trigger signal from the user component prior to receiving the image.

16. The computer-implemented method according to claim 9, further comprising receiving a live sharing trigger signal from the agent component prior to receiving the image, and transmitting a second live sharing trigger signal to the user component in response to the live sharing trigger signal, the second live sharing trigger signal configured to prompt the user component to generate and transmit the image.

17. The computer-implemented method according to claim 16, wherein the second live sharing trigger signal is configured to cause a prompt to be displayed on a screen of a first client device associated with the user component to approve transmission of the image.

18. The computer-implemented method according to claim 9, further comprising receiving agent feedback from the agent component, and transmitting the agent feedback to the user component.

19. The computer-implemented method according to claim 9, further comprising establishing at least an audio call between a user associated with the user component and an agent associated with the agent component prior to receiving the image.

20. The computer-implemented method according to claim 9, further comprising:

receiving, from the user component via the first connection, a sequence of images;

applying the sequence of images sequentially to the masking engine by:

extracting, via the OCR model, text from each image of the sequence of images to generate extracted text;

classifying, via the text-based classification model, at least a portion of the extracted text from each image as sensitive text; and masking, via the image processing model, the sensitive text for each image to generate a sequence of masked images; and sequentially transmitting, via one or more processors, to the agent component via the second connection, each masked image of the sequence of masked images in real-time as each masked image is generated.

21. A server comprising at least one processor and at least one memory, the at least one memory comprising computer coded instructions therein, wherein the computer coded instructions are configured to, when executed by the at least one processor, cause the server to:

establish a first connection with a user component, the user component configured to cause capture of images representative of at least a portion of a graphical user interface displayed at a client device;

establish a second connection with an agent component;

receive, from the user component via the first connection, an image representative of at least a portion of the graphical user interface, the portion of the graphical user interface comprising sensitive text;

apply the image to a masking engine by:

extracting, via an optical character recognition (OCR) model, text of the graphical user interface from the image to generate extracted text;

classifying, via a text-based classification model applied to the extracted text, at least a portion of the extracted text as sensitive text based on contents of the extracted text; and masking, via an image processing model, the sensitive text to generate a masked image; and transmit, to the agent component via the second connection, the masked image.

22. The server of claim 21, wherein the image is encrypted, and wherein the computer coded instructions are further configured to, when executed by the at least one processor, cause the server to decrypt the image prior to applying the image to the masking engine.

23. The server of claim 22, wherein the masked image is unencrypted.

* * * * *